(12) United States Patent
Speak et al.

(10) Patent No.: US 11,663,025 B2
(45) Date of Patent: May 30, 2023

(54) MAINTENANCE OF AND CACHING OF SUSPENDED VIRTUAL COMPUTERS IN A POOL OF SUSPENDED VIRTUAL COMPUTERS

(71) Applicant: BANKVAULT PTY LTD, Western (AU)

(72) Inventors: Graeme Speak, Western (AU); Neil Richardson, Western (AU); Chris Hoy Poy, Western (AU)

(73) Assignee: BANKVAULT PTY LTD, West Perth (AU)

( * ) Notice: Subject to any disclaimer, the term of this patent is extended or adjusted under 35 U.S.C. 154(b) by 0 days.

(21) Appl. No.: 15/024,159

(22) PCT Filed: May 23, 2014

(86) PCT No.: PCT/AU2014/050050
§ 371 (c)(1),
(2) Date: Mar. 23, 2016

(87) PCT Pub. No.: WO2015/039181
PCT Pub. Date: Mar. 26, 2015

(65) Prior Publication Data
US 2016/0232025 A1 Aug. 11, 2016

(30) Foreign Application Priority Data

Sep. 23, 2013 (AU) .................. 2013903666
Sep. 23, 2013 (AU) .................. 2013903667
Oct. 7, 2013 (AU) .................. 2013903853

(51) Int. Cl.
*G06F 9/455* (2018.01)
*G06F 9/445* (2018.01)
*G06F 9/50* (2006.01)

(52) U.S. Cl.
CPC ........ *G06F 9/45558* (2013.01); *G06F 9/4451* (2013.01); *G06F 9/45533* (2013.01);
(Continued)

(58) Field of Classification Search
None
See application file for complete search history.

(56) References Cited

U.S. PATENT DOCUMENTS 7,725,531 B1 * 5/2010 Sood .................. H04L 67/02
709/203
8,060,683 B2 * 11/2011 Shultz .................. G06F 9/5077
711/118
(Continued)

FOREIGN PATENT DOCUMENTS

CN 102882947 A 1/2013
JP 2013-084276 5/2013
(Continued)

*Primary Examiner* — Abu Zar Ghaffari
(74) *Attorney, Agent, or Firm* — PATENTTM.US

(57) ABSTRACT

Described is a computer system for providing virtual computers. The computer system includes a pool facility for storing a pool of suspended virtual computers based on at least one virtual computer template. The computer system includes a provision manager for ensuring that a series of system logon requests results in the user being provided with a series of virtual computers that reflect applied updates. The provision manager includes an update facility, a resume facility and a customization facility. The update facility regularly applies updates to the virtual computer template to ensure that each virtual computer reflects the updates. The resume facility resumes suspended virtual computers provided by the pool facility. The customization facility customizes each virtual computer for the particular user after the virtual computer is resumed from the pool of suspended
(Continued)

virtual computers, the customization including providing the resumed virtual computer with a user data layer.

13 Claims, 26 Drawing Sheets

(52) U.S. Cl.
CPC .. *G06F 9/5061* (2013.01); *G06F 2009/45562* (2013.01); *G06F 2009/45575* (2013.01); *G06F 2209/5011* (2013.01)

(56) References Cited

U.S. PATENT DOCUMENTS

| | | | | |
|---|---|---|---|---|
| 8,065,676 B1* | 11/2011 | Sahai | G06F 9/5077 | 709/226 |
| 8,176,486 B2* | 5/2012 | Amir Husain | H04L 65/1069 | 718/1 |
| 8,359,594 B1* | 1/2013 | Davidson | G06F 9/45558 | 718/1 |
| 8,631,131 B2* | 1/2014 | Kenneth | G06F 12/0866 | 709/203 |
| 8,719,415 B1* | 5/2014 | Sirota | G06F 9/5061 | 709/221 |
| 8,776,058 B2* | 7/2014 | Heyman | G06F 9/45558 | 718/1 |
| 9,141,420 B2* | 9/2015 | Chang | G06F 9/45558 | |
| 9,329,889 B2* | 5/2016 | Lin | G06F 9/45558 | |
| 9,507,612 B1* | 11/2016 | Henry | G06F 9/452 | |
| 9,639,384 B2* | 5/2017 | Govindankutty | G06F 9/45533 | |
| 9,851,988 B1* | 12/2017 | Elisha | G06F 9/5077 | |
| 9,870,588 B1* | 1/2018 | Genov | G06Q 40/00 | |
| 2007/0089111 A1* | 4/2007 | Robinson | G06F 21/53 | 718/1 |
| 2007/0300220 A1* | 12/2007 | Seliger | H04L 63/0272 | 718/1 |
| 2008/0134176 A1* | 6/2008 | Fitzgerald | G06F 9/45537 | 718/1 |
| 2008/0271016 A1 | 10/2008 | Chess | | |
| 2009/0007105 A1* | 1/2009 | Fries | G06F 8/65 | 718/1 |
| 2009/0125902 A1* | 5/2009 | Ghosh | G06F 9/45533 | 718/1 |
| 2009/0282404 A1* | 11/2009 | Khandekar | G06F 9/45558 | 718/1 |
| 2009/0288084 A1* | 11/2009 | Astete | G06F 9/45533 | 718/1 |
| 2009/0296726 A1* | 12/2009 | Snively | H04L 45/66 | 370/401 |
| 2010/0153617 A1* | 6/2010 | Miroshnichenko | G06F 3/061 | 718/1 |
| 2010/0199122 A1* | 8/2010 | Sood | H04L 61/1511 | 714/4.1 |
| 2010/0262722 A1* | 10/2010 | Vauthier | G06F 9/45558 | 718/1 |
| 2011/0066786 A1* | 3/2011 | Colbert | G06F 9/45558 | 711/6 |
| 2011/0083122 A1* | 4/2011 | Chen | G06F 11/3664 | 717/124 |
| 2011/0184993 A1* | 7/2011 | Chawla | G06F 9/45533 | 707/802 |
| 2011/0185292 A1* | 7/2011 | Chawla | G06F 9/452 | 715/760 |
| 2011/0209145 A1* | 8/2011 | Chen | G06F 9/45504 | 718/1 |
| 2011/0238820 A1* | 9/2011 | Matsuoka | G06F 9/5077 | 709/224 |
| 2012/0017210 A1* | 1/2012 | Huggins | G06F 9/5055 | 718/1 |
| 2012/0084782 A1* | 4/2012 | Chou | G06F 12/08 | 711/6 |
| 2012/0122573 A1 | 5/2012 | Ha et al. | | |
| 2012/0144391 A1 | 6/2012 | Ueda | | |
| 2012/0151477 A1 | 6/2012 | Sinha et al. | | |
| 2012/0179511 A1* | 7/2012 | Lee | G06Q 10/063118 | 705/7.37 |
| 2012/0311579 A1* | 12/2012 | Lee | G06F 9/45558 | 718/1 |
| 2013/0007737 A1* | 1/2013 | Oh | G06F 9/4445 | 718/1 |
| 2013/0055241 A1* | 2/2013 | De | G06F 8/63 | 718/1 |
| 2013/0067345 A1* | 3/2013 | Das | G06F 8/63 | 715/740 |
| 2013/0074072 A1* | 3/2013 | Kennedy | G06F 9/44505 | 718/1 |
| 2013/0179881 A1* | 7/2013 | Calder | G06F 9/5088 | 718/1 |
| 2013/0185716 A1* | 7/2013 | Yin | G06F 9/45558 | 718/1 |
| 2013/0212709 A1* | 8/2013 | Tucker | G06F 21/55 | 726/29 |
| 2013/0238673 A1* | 9/2013 | Rokuhara | G06F 17/3007 | 707/821 |
| 2013/0275975 A1* | 10/2013 | Masuda | G06F 9/45558 | 718/1 |
| 2013/0326510 A1* | 12/2013 | Adekile | G06F 11/0709 | 718/1 |
| 2013/0326639 A1* | 12/2013 | Droste | G06F 21/55 | 726/28 |
| 2013/0339956 A1* | 12/2013 | Murase | G06F 9/505 | 718/1 |
| 2014/0089495 A1* | 3/2014 | Akolkar | H04L 41/147 | 709/224 |
| 2014/0130043 A1* | 5/2014 | Mahindru | G06F 9/45558 | 718/1 |
| 2014/0173213 A1* | 6/2014 | Beveridge | G06F 3/061 | 711/130 |
| 2014/0282519 A1* | 9/2014 | Apte | G06F 9/45533 | 718/1 |
| 2014/0282525 A1* | 9/2014 | Sapuram | G06Q 30/0631 | 718/1 |
| 2015/0058837 A1* | 2/2015 | Govindankutty | G06F 9/45558 | 718/1 |

FOREIGN PATENT DOCUMENTS

| | | |
|---|---|---|
| JP | 2013-516715 | 5/2013 |
| JP | 2013-186793 | 9/2013 |
| WO | 20070117363 | 10/2007 |
| WO | WO2011/085335 | 7/2011 |
| WO | WO2013/145434 | 10/2013 |

* cited by examiner

Fig. 24

App Store

Search

My app suites

Apps
  Accessories
  Development
  Education
  Games
  Graphics
  Internet
  Library
  Multimedia
  Office
File Server
Security Groups
Add Users
Virtual Private Servers

Featured Apps

Calibre
Calibre library man...
$1.99
[Install]

Gimp
GNU Image Manipu...
$2.99
[Install]

Flash
Adobe Flash Browsers
$2.99
[Install]

Acrobat
Adobe Reader
Free!
[Install]

Keepassx
Cross Platform Pas...
Free!
[Install]

Gnumeric
spreadsheet applic...
$2.99
[Install]

Gnucash
personal and small...
$4.99
[Install]

Libreoffice
Office Productivity S...
$5.99
[Install]

Fig. 25
GetActiveGoldImage (0.039571 seconds)
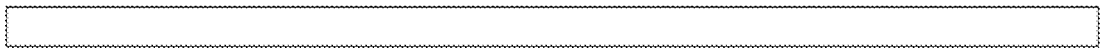
AllocateIP (0.066303 seconds)
RegisterMachine (0.05087 seconds)
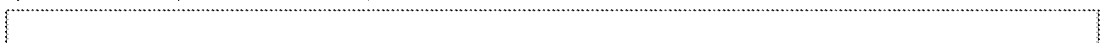
MachineToHostname (0.030241 seconds)
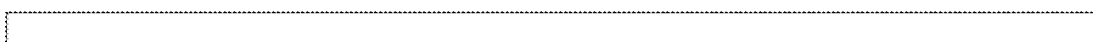
GetKeytab (0.813389 seconds)
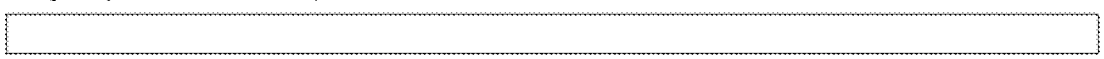
AutosignMachine (0.02223 seconds)
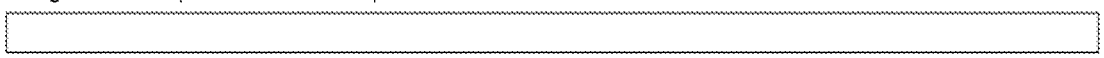
UpdateMachineDNS (0.061821 seconds)
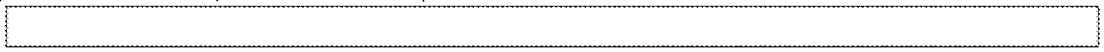
ClonePoolVM (127.698363 seconds)
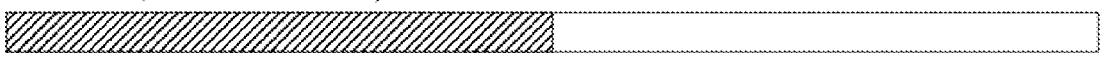
PowerOn (9.651645 seconds)
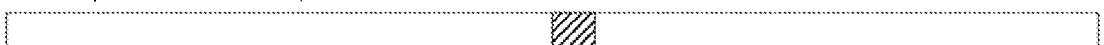
WaitForXRDP (30.089933 seconds)
Sleep90 (90.106405 seconds)
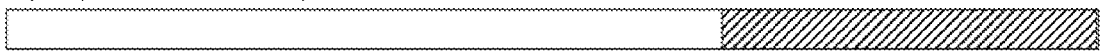
SuspendMachine (0.04013 seconds)
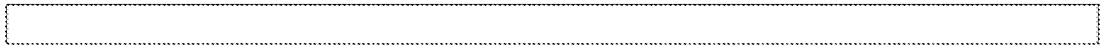
SetMachineAvailable (0.034693 seconds)
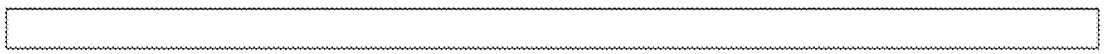

Fig. 26
GetUserID(0.187464 seconds)
CheckAccountActive (0.050262 seconds)
GetUserType (0.038247 seconds)
CheckMachinesUsed (0.03028 seconds)
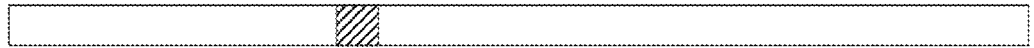
GetActiveGoldImage (0.038205 seconds)
GetProfileForUser (0.041925 seconds)
AllocateMachine (0.082452 seconds)
MachineToHostmane (0.030317 seconds)
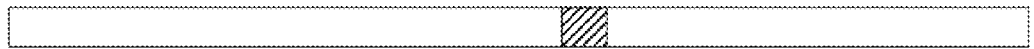
SetupMemory (0.042275 seconds)
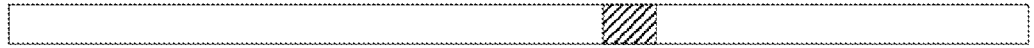
ResumeMachine (0.038268 seconds)
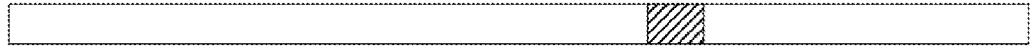
UpdateDNS (0.078308 seconds)
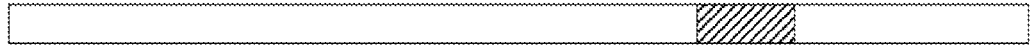
GetMachineInfo (0.13409 seconds)
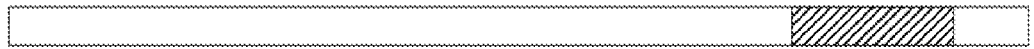
StartSession (0.07047 seconds)

MAINTENANCE OF AND CACHING OF SUSPENDED VIRTUAL COMPUTERS IN A POOL OF SUSPENDED VIRTUAL COMPUTERS

CROSS-REFERENCE TO RELATED APPLICATIONS

This application is the National Stage of International Application No. PCT/AU2014/050050, filed on May 23, 2014, which claims the priority of AU Application No. 2013903666, filed on Sep. 23, 2013; AU Application No. 2013903667, filed Sep. 23, 2013 and AU Application No. 2013903853, filed Oct. 7, 2013. The contents of these applications are hereby incorporated by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

In particular forms the present invention concerns computing systems and methods for providing virtual computers.

BACKGROUND TO THE INVENTION

Virtualization is the process of taking computer resources comprising processing, memory and storage and providing an artificial environment for network, machine, input/output, application or storage functionality. In common use, virtualization generally refers to the operation of real world systems as a virtualized infrastructure which operates similarly to a physical infrastructure.

The expression 'virtual network' generally refers to the provision of physical network functionality by emulating the network in a software/virtualised environment. The expression 'virtual machine' is used in various contexts. In order to clarify the various contexts, the expression 'system virtual machine' generally refers to providing the functionality of a complete platform that supports the execution of a functioning operating system. In comparison, the expression 'process virtual machine' generally refers to providing the functionality of a platform that supports the execution of a single process, the process being an instance of an application. The expression 'virtual computer' as used herein generally refers to a system virtual machine as opposed to a process virtual machine.

The expression 'hypervisor' generally refers to a facility that provides for the provision of a number of virtual computers in a virtualization system. A hypervisor provides the system processor, memory and other resources to the operating system of the virtual computers. The operating system of each virtual computer provides common services for various applications.

Hypervisors are provided in a number of forms. 'Type 1 hypervisors' provide an interface immediately beneath one or more system virtual machines and immediately above the underlying hardware with no intervening operating system. Type 1 hypervisors communicate directly with the underlying physical server hardware. For this reason type 1 hypervisors are sometimes known as bare metal hypervisors.

'Type 2 hypervisors' provide an interface immediately beneath one or more system virtual computers and immediately above an underlying operating system.

In both cases the role of a hypervisor is to generally supervise and provide one or more virtual computers while maintaining separation policies therebetween.

In virtualization systems employing hypervisors, cloning is generally provided to allow copying of virtual computers. It is possible to provide a number of types of clone. For example a 'full clone' generally refers to an independent copy of a virtual computer, the clone being entirely separate from the original virtual computer. A 'linked clone' generally refers to sharing a virtual disk with the original virtual computer to use the same software installation. In general a linked clone cannot operate without access to the original virtual computer. This arises due to a delta type arrangement being stored rather than a unified copy.

Generally linked clones can be created relatively quickly. Whilst the speed of creation is improved, linked clones sometimes suffer from performance degradation.

In a virtualization system, a snapshot facility will generally provide a clone by making a snapshot to disk. In some systems such as VMware a snapshot is similar to a linked clone. Generally a user is able to repeatedly return to a snapshot after activation. A snapshot can be considered as a repeatable suspended state of a virtual computer.

A suspend store facility will generally preserve the state of a virtual computer by saving the state of the virtual computer to disk without repeatability. With some systems the suspend facility provides a suspension pause facility storing the virtual computer state in memory without repeatability. A suspension store facility generally frees up memory and virtual CPUs. A suspension pause facility generally keeps the virtual machine in a frozen state with memory allocation still being provided. In both cases the processing and I/O operations of the virtual machine is suspended in a substantial manner. Notably resuming a suspended state from a suspend store state or suspend pause state does not allow the user to return to the same state repeatedly. The virtual machine is resumed from a suspended state and continues operating from the same point at which the machine was suspended without being able to return to the suspended state.

It is to be recognised that any discussion in the present specification is intended to explain the context of the present invention. It is not to be taken as an admission that the material discussed formed part of the prior art base or relevant general knowledge in any particular country or region.

SUMMARY OF THE INVENTION

According to an aspect of preferred embodiments herein described there is provided a method of providing virtual computers, the method including: ensuring that a series of system logon requests by users results in each user being provided with a series of virtual computers that reflect applied updates; each virtual computer being provided by resuming a virtual computer from a pool of suspended virtual computers where the suspended virtual computers are based on at least one virtual computer template; customizing each virtual computer after being resumed from the pool of suspended virtual computers to provide an active virtual computer; and regularly updating the at least one virtual computer template.

Preferably the method includes ensuring that the virtual computers provided to the users are regularly updated by terminating virtual computers based on system logoff requests by users.

Preferably the method includes ensuring that the virtual computers provided to the users are regularly updated by maintaining suspended virtual computers in the pool based on one or more regularly updated virtual computer templates.

Preferably the method includes maintaining suspended virtual computers in the pool includes creating suspended virtual computers in the pool and ensuring that the suspended virtual computers have a desirable turnover rate.

Preferably the method includes maintaining suspended virtual computers in the pool includes providing suspended virtual computers in the pool and deleting or otherwise removing older suspended virtual computers from the pool.

Preferably the method includes providing suspended virtual computers in the pool with each suspended virtual computer having services suspended in a substantially deployed state.

Preferably the method includes providing the suspended virtual computers in the pool with each suspended virtual computer having remote desktop services suspended in a substantially deployed state.

Preferably the substantially deployed state comprises a state in which the services are available as part of a fully operational system in the sense of being enabled and functional.

Preferably the method includes providing the suspended virtual computers in the pool by cloning one or more of the virtual computer templates to provide a number of virtual computers; installing applications on the virtual computers according to the different user classes; and suspending the virtual computers.

Preferably, in order to accommodate different user classes, the method includes uninstalling applications from a number of virtual computers cloned from the at least one virtual computer template.

Preferably the method includes creating suspended virtual computers in the pool with each suspended virtual computer having services suspended in a substantially deployed state; and ensuring that application installation or uninstallation is limited to 30 seconds or less in duration.

Preferably customizing the resumed virtual computer for a user includes allocating a security profile for the user.

Preferably the method includes communicating with a classification update facility to instruct active virtual computers to install or remove applications in response to alterations in user classification.

Preferably the suspended virtual machines are suspended in memory in a non-repeatable suspended state. The suspended virtual machines may be suspended in memory in a repeatable suspended state. The suspended virtual machines may be suspended on disk in a non-repeatable suspended state. The suspended virtual machines may be suspended on disk in a repeatable suspended state.

According to an aspect of preferred embodiments herein described there is provided a method of providing virtual computers, the method including: creating at least one virtual computer template; determining whether the or each at least one virtual computer template requires updating; caching suspended virtual computers based on the at least one virtual computer template; resuming the cached suspended virtual computers to provide active virtual computers in response to system logon requests.

Preferably each suspended virtual computer is cached with services suspended in a substantially deployed state.

According to an aspect of preferred embodiments herein described there is provided a method of providing virtual computers, the method including: providing a series of virtual computers as a result of a series of logins; wherein providing each virtual computer in the series of virtual computers includes resuming a suspended virtual computer from a pool of suspended virtual computers to provide a resumed virtual computer and customizing the resumed virtual computer; the suspended virtual computers in the pool being based on at least one virtual computer template.

Preferably the method includes creating suspended virtual computers in the pool with each suspended virtual computer having services suspended in a substantially deployed state.

According to an aspect of preferred embodiments herein described there is provided a method of providing virtual computers, the method including: caching suspended virtual computes; and resuming the cached suspended virtual computers to provide active virtual computers in response to system logon requests.

According to an aspect of preferred embodiments herein described there is provided a method of providing virtual computers, the method including: providing a series of virtual computers as a result of a series of logins by a user, wherein providing each virtual computer in the series of virtual computers includes resuming a suspended virtual computer to provide a resumed virtual computer, and customizing the resumed virtual computer for the user.

According to an aspect of preferred embodiments herein described there is provided a method of providing virtual computers, the method including: ensuring that a series of system logon requests by users results in the users being provided with a series of virtual computers that reflect applied updates; each virtual computer being provided by resuming a virtual computer from a pool of suspended virtual computers where the suspended virtual computers are based on at least one virtual computer template; customizing each virtual computer after being resumed from the pool of suspended virtual computers to provide an active virtual computer; and regularly updating the at least one virtual computer template.

According to an aspect of preferred embodiments herein described there is provided a computer system for providing virtual computers, the computer system including: a pool facility for storing a pool of suspended virtual computers based on at least one virtual computer template; and a provision manager for providing a series of virtual computers as a result of a series of system logon requests by users; the provision manager including an update facility, a resume facility and a customization facility; the update facility for updating the or each at least one virtual computer template; the resume facility for resuming virtual computers from the pool of suspended virtual computers provided by the pool facility; the customization facility for customizing virtual computers after being resumed from the pool of suspended virtual computers to provide active virtual computers.

Preferably the provision manger includes a termination facility for terminating virtual computers based on system logoff requests; the termination facility for assisting with ensuring that the virtual computers provided to the users are regularly updated.

Preferably the provision manger is able to ensure that the virtual computers provided to the users are regularly updated by maintaining suspended virtual computers in the pool based on one or more regularly updated virtual computer templates.

Preferably the provision manager is configured to maintain suspended virtual computers in the pool by ensuring that the suspended virtual computers have a desirable turnover rate.

Preferably the provision manager is configured for maintaining suspended virtual computers in the pool by creating suspended virtual computers in the pool and deleting or other removing older suspended virtual computers in the pool.

Preferably the provision manger includes a creation facility configured for providing suspended virtual computers in the pool with each suspended virtual computer having services suspended in a substantially deployed state.

Preferably the creation facility is configured for providing the suspended virtual computers in the pool with each suspended virtual computer having remote desktop services suspended in a substantially deployed state.

Preferably the substantially deployed state comprises a state in which services are available as part of a fully operational system in the sense of being enabled and functional.

Preferably the provision manager includes: a creation facility for providing the suspended virtual computers in the pool by cloning one or more of the at least one virtual computer template to provide a number virtual computers; an installation facility for installing applications according to the different user classes; and a suspension facility for suspending the virtual computers.

Preferably the provision facility includes an uninstall facility for accommodating different user classes, the uninstall facility for uninstalling applications from virtual computers cloned from the at least one virtual computer template.

Preferably the system includes a classification update facility for instructing active virtual computers to install or remove applications from in response to alterations in user classification.

According to an aspect of preferred embodiments herein described there is provided a computer system for providing virtual computers to users, the computer system including: a provision manager for providing a series of virtual computers for a series of system logon requests by users; the provision manager including a resume facility and a customization facility; the resume facility for resuming suspended virtual computers; the customization facility for customizing virtual computers for the users after being resumed.

According to an aspect of preferred embodiments herein described there is provided a computer system for providing virtual computers, the computer system including: a creation facility for providing virtual computer templates; an update facility for determining whether revised virtual computer templates are required with new updates; a cache facility for caching suspended virtual computers based on the virtual computer templates; and a resume facility for resuming the cached suspended virtual computers to provide virtual computers in response to system logon requests by users.

Preferably the cache facility is configured to cache each suspended virtual computer in a state with services suspended in a substantially deployed state.

According to an aspect of preferred embodiments herein described there is provided a computer system for providing virtual computers, the computer system including: a pool facility for storing a pool of suspended virtual computers based on at least one virtual computer template; and a provision manager for providing a series of virtual computers as a result of a series of system logon requests by users; the provision manager including an update facility, a resume facility and a customization facility; the update facility for updating the or each at least one virtual computer template; the resume facility for resuming virtual computers from the pool of suspended virtual computers provided by the pool facility; the customization facility for customizing virtual computers after being resumed from the pool of suspended virtual computers to provide active virtual computers.

Preferably the cache facility is configured to cache each suspended virtual computer in a state with services suspended in a substantially deployed state.

Preferably there is provided a preceding method or system, run via at least one computer processor.

Preferably there is provided a non-transient computer readable medium having stored thereon computer executable instructions for performing a computer implemented method as detailed above.

Preferably there is provided a non-transient computer readable medium having stored thereon computer executable instructions encoding a computer implemented system as detailed above.

Preferably there is provided a non-transient computer-readable medium encoded with one or more facilities configured to run an application configured to carry out a number of operations to provide any one of the preceding methods or systems Preferably there is provided a non-transient computer implemented method or system detailed above.

According to an aspect of preferred embodiments herein described there is provided a computer system for providing virtual computers, the computer system including: a creation facility for providing virtual computer templates; an update facility for determining whether revised virtual computer templates are required with new updates; and a provision facility for providing virtual computers in response to system logon requests by users.

According to an aspect of preferred embodiments herein described there is provided a method of providing virtual computers, including: creating virtual computer templates; providing new virtual computers in response to system logon requests by users; and updating the computer templates.

As will be discussed embodiments of the present invention are considered to provide number of preferred arrangements including:

(i) Systems and methods that maintain a pool of computers in a manner that users will regularly be provided with virtual computers that incorporate recent updates.

(ii) Systems and methods that maintain a pool of computers in a manner that is able to readily accommodate varying numbers of users requiring access at a different times, the precise time of each users requiring access being unknown.

(iii) Systems and methods that maintain a pool of computers in a manner that is able to accommodate different user application classes by providing suspended virtual computers for different categories, and adding or removing applications for different user classes.

(iv) Systems and methods that provide an application update mechanism that serves to update active virtual computers associated with users based on different user application classes associated with the users.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings in which:

FIG. 24 provides a screenshot of an application store provided in the system shown in FIG. 23;

FIG. 25 provides a screen shot providing a time breakdown of a first process in relation to the system shown in FIG. 23;

FIG. 26 provides a screenshot providing a time breakdown of another process in relation to the system shown in FIG. 23.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
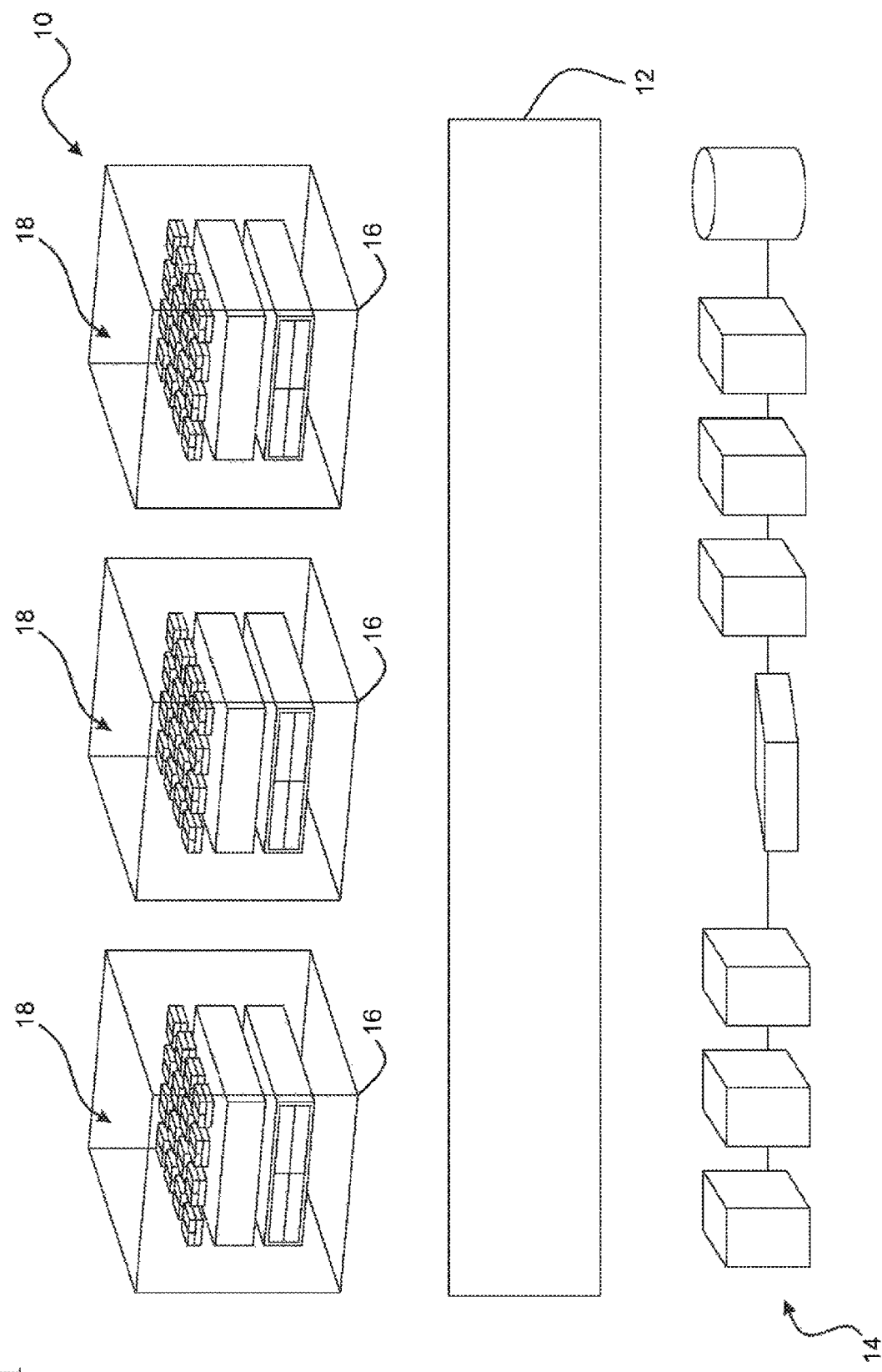
FIG. 1 provides a schematic illustration of a computer system according to a first preferred embodiment of the invention.

Referring to FIG. 1 there is shown a computer system 10 according to a first preferred embodiment of the present invention. The computer system 10 provides virtualization infrastructure as illustrated by box 12. The computer system 10, is provided using a public cloud network 14.

Figure 2:
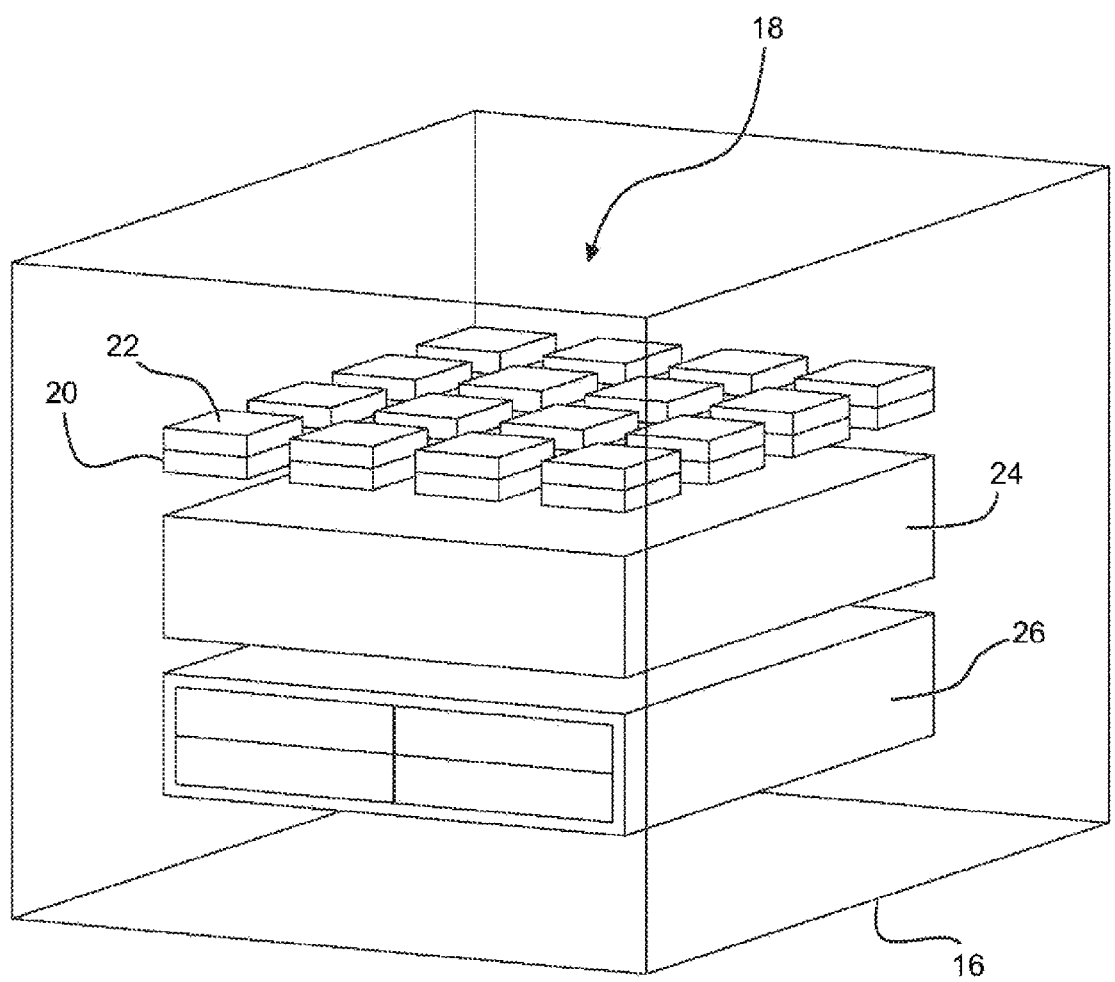
FIG. 2 provides a schematic illustration of a virtual computer shown in FIG. 1.

As part of the computer system, a number of servers 16 provide virtual computers 18. Referring to FIG. 2 each virtual computer includes an operating system 20 and applications 22. A type 1 hypervisor 24 is installed on server hardware 26.

Figure 3:
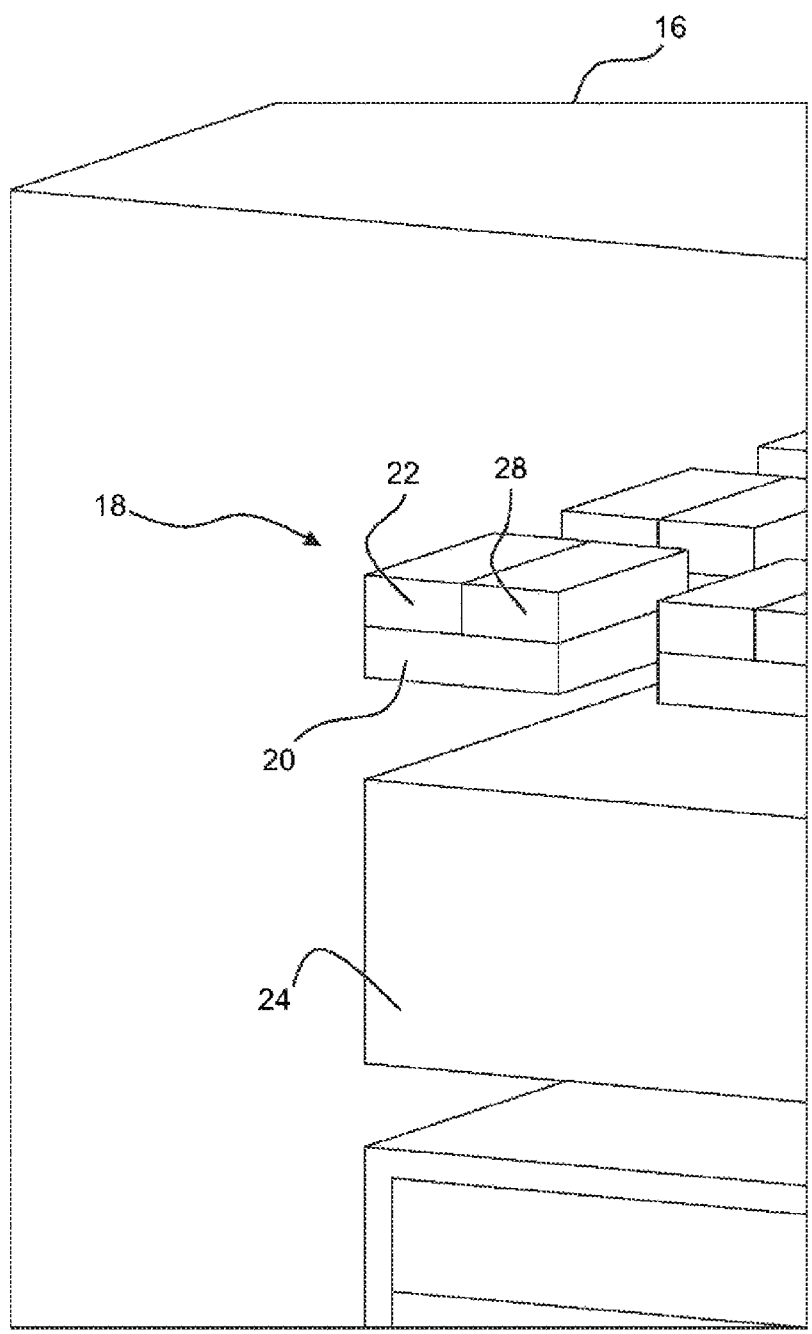
FIG. 3 provides a further illustration in relation to the virtual computer shown in FIG. 2.
Figure 4:
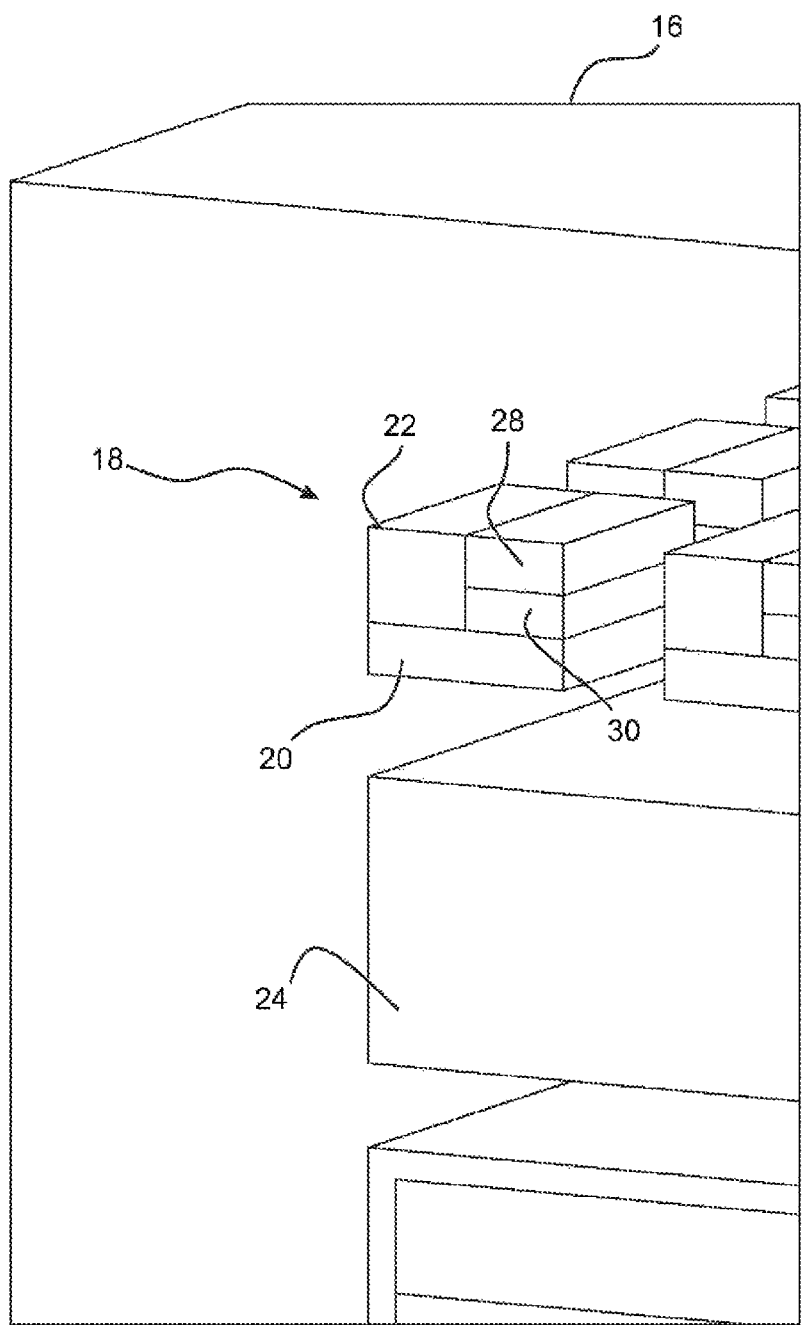
FIG. 4 provides a further illustration in relation to the virtual computer shown in FIG. 2.

FIG. 3 illustrates user data 28 forming part of each virtual computer 18. FIG. 4 illustrates decoupling of the user data 28 from the operating system 20. As shown there is provided user data virtualization 30. The user data virtualization 30 provides a layer allowing separation of the user data including files, configuration and settings from the operating system and applications. As would be apparent other embodiments may include application virtualization.

Figure 5:
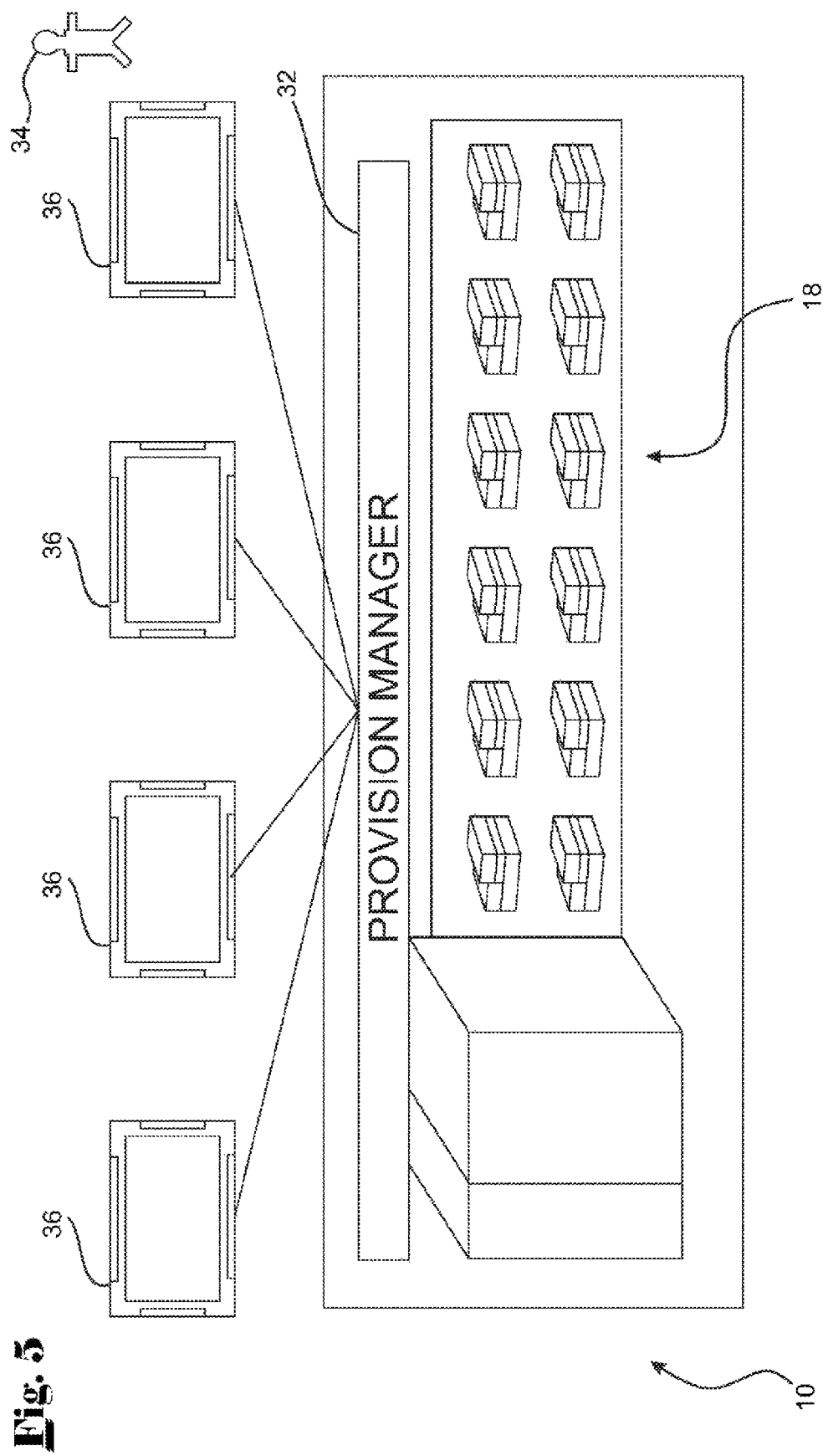
FIG. 5 provides a further illustration of the computer system shown in FIG. 1.

As shown in FIG. 5, the computer system 10 includes a provision manager 32. The provision manager 32 acts a broker providing users 34 with access to the virtual computers 18. Each user 34 has a client 36 that provides access to respective virtual computers 18. The virtual computers 18 are provided to the users 34 as virtual computers having virtual desktops.

Figure 6:
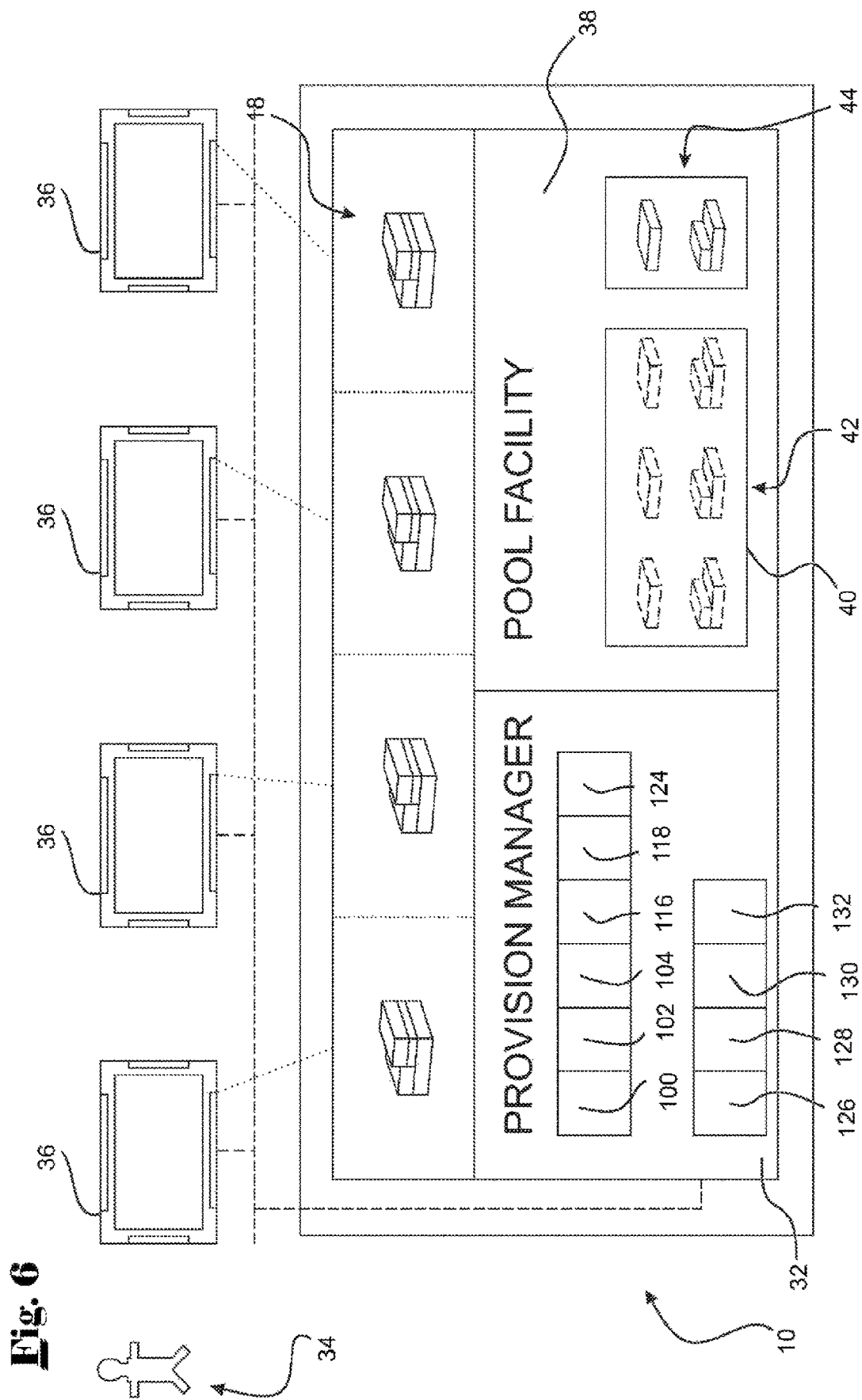
FIGS. 6 and 7 provide further illustrations in relation to FIG. 5.

Referring to FIG. 6, the computer system 10 includes a pool facility 38 as part of the virtualization infrastructure. The pool facility 38 stores a pool 40 of suspended virtual computers 42. The suspended virtual computers 42 are based on two virtual computer templates 44. The virtual computer templates 44 comprise golden images. In another embodiments the virtual computer templates comprise active or suspended virtual computers.

Figure 7:
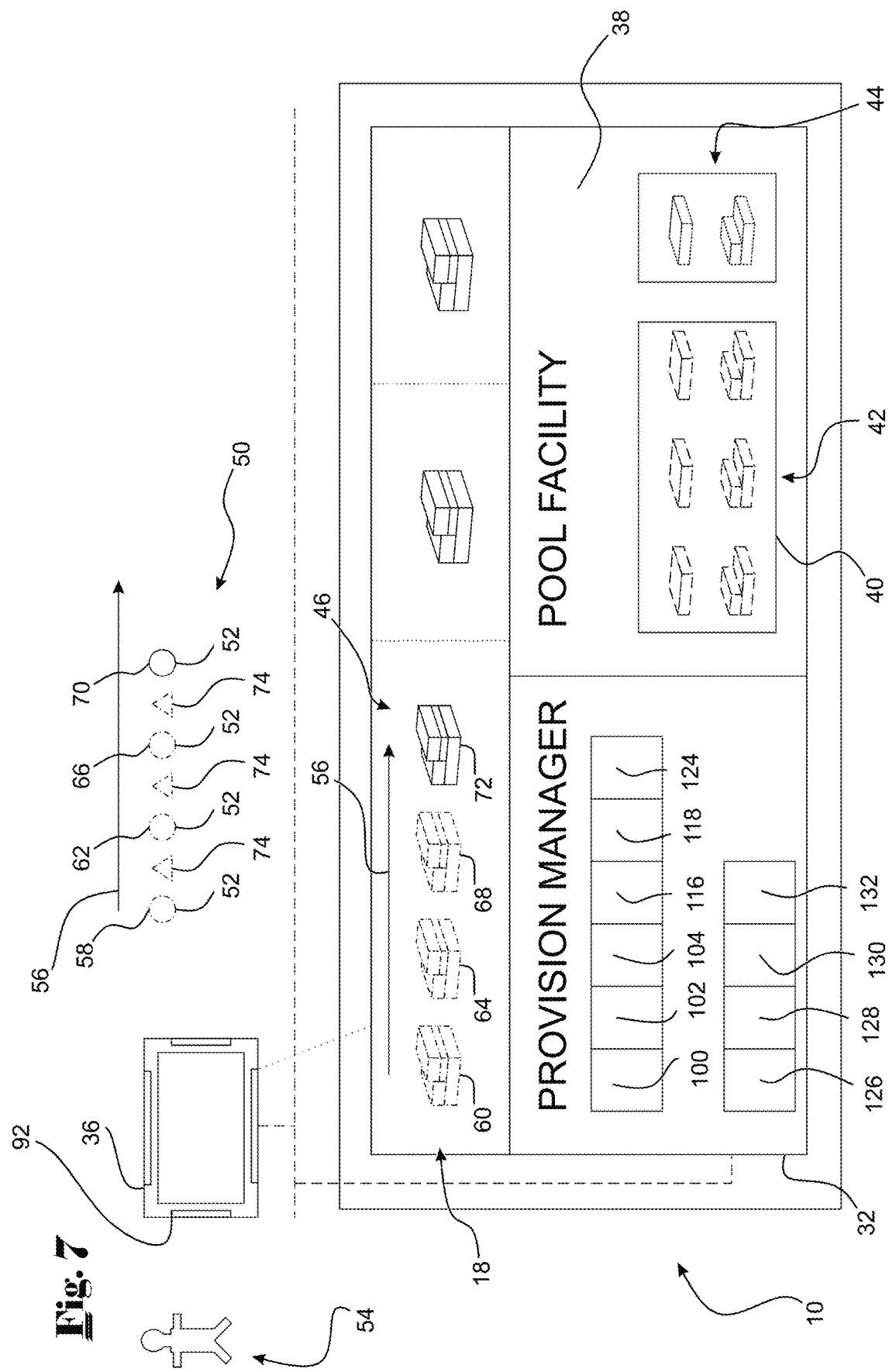

Referring to FIG. 7, the provision manager 32 is configured to provide a series 46 of virtual computers 48, over time, as a result of a series 50 of system logon requests 52 by user 54. From the viewpoint of the user group a similar statement can be made in connection with the users as a whole.

In the computer system 10, a single user account is associated with no more than one virtual computer 18 at any one time. Other arrangements are of course possible.

The passing of time is represented by arrows 56. A first system logon request 58 by the user 54 results in the provision of a virtual computer 60. A subsequent system logon request 62 results in the provision of a virtual computer 64. A subsequent system logon request 66 results in the provision of a virtual machine 68. A final system logon request 70 results in the provision of a virtual computer 72. In the embodiment the provision manger 32 ensures that each of the system logon requests 52 is separated by a system logoff requests 74. Each system logoff request 74 terminates the current virtual computer associated with the user.

Figure 8:
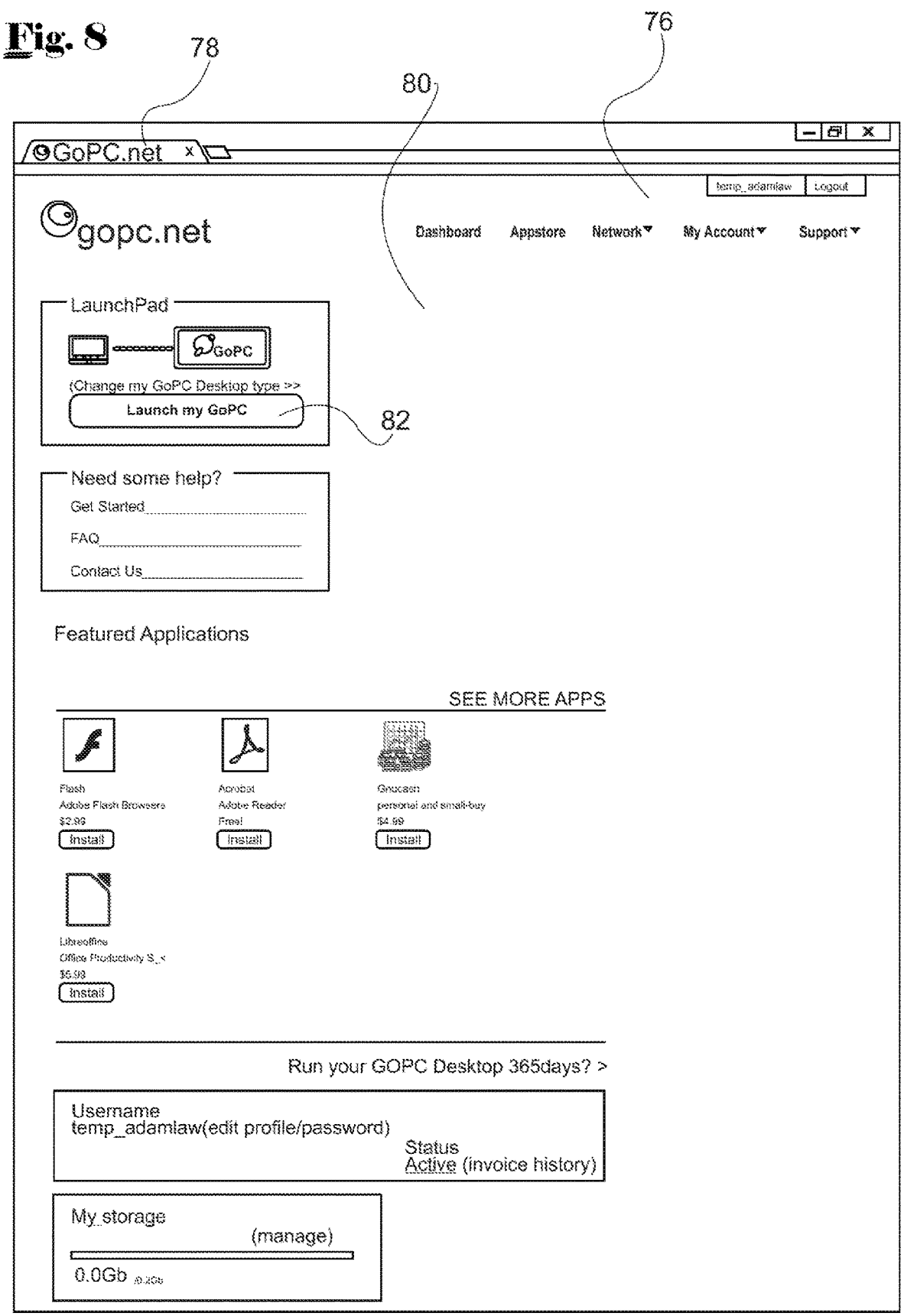
FIGS. 8 to 11 provide screen images demonstrating the manner in which system logon requests are handled in the system shown in FIG. 1.
Figure 9:
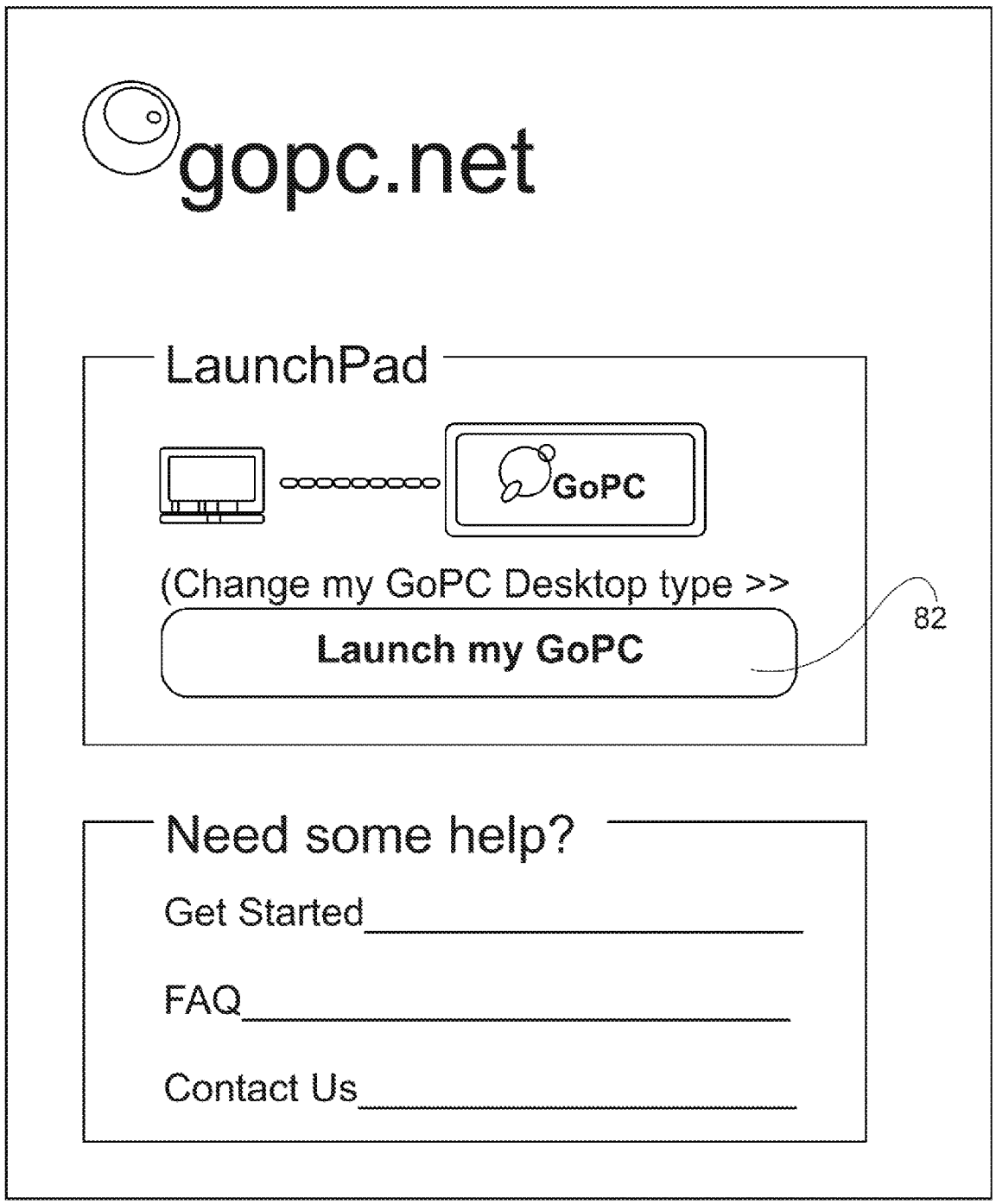
Figure 10:
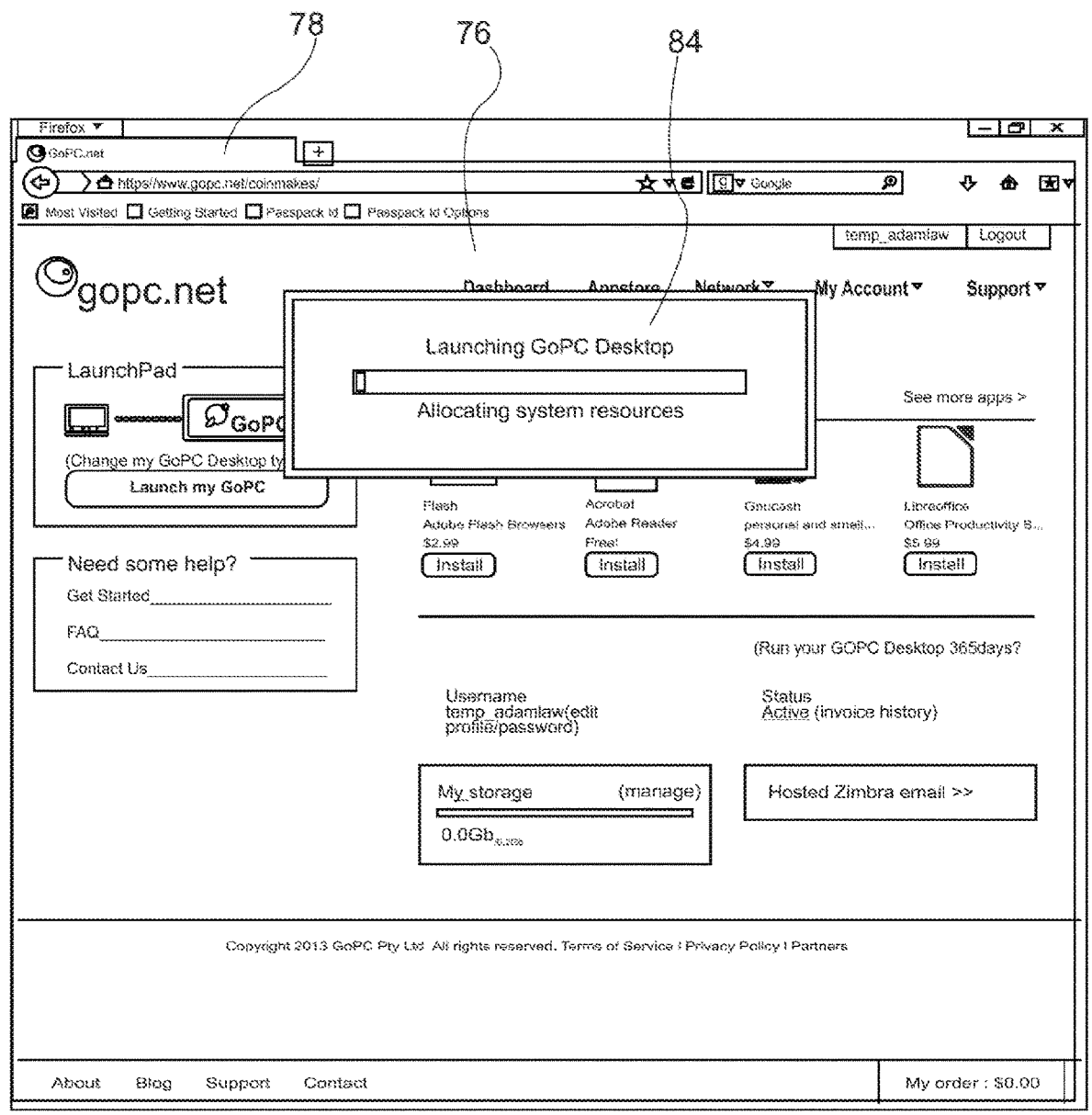

The manner in which system logon requests 52 are initiated is demonstrated in FIGS. 8 and 9. In order to issue a system logon request, a user 54 uses an interface 76 provided a browser 78. The interface 76 provides a dashboard 80 providing a system logon request facility 82 in the form of a button. In operation the user 54 activates the system logon request facility 82 and is provided with a loading indicator 84. The loading indicator 84 is illustrated in FIG. 10.

Figure 11:
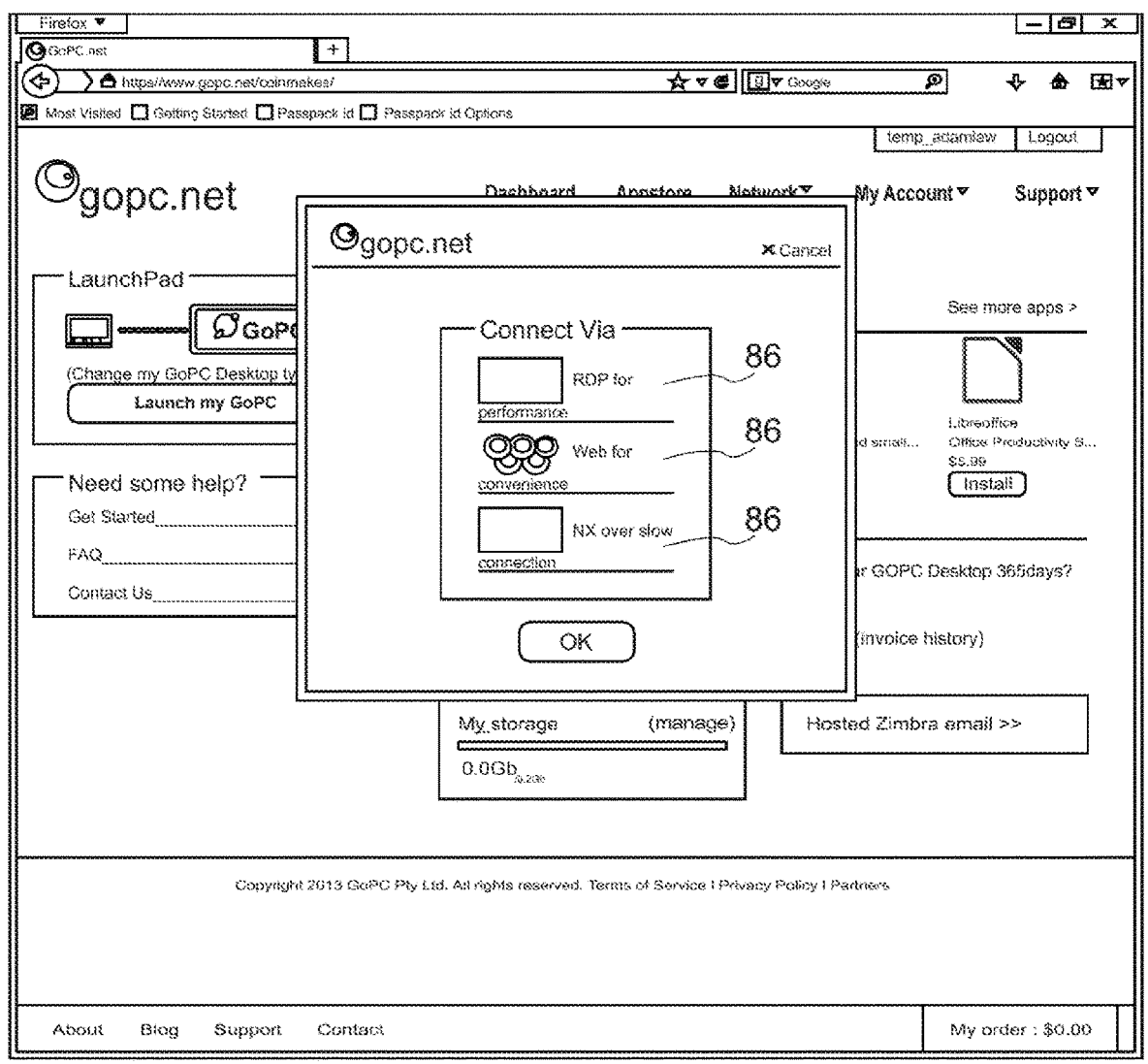

Referring to FIG. 11, the user 54 is subsequently provided with a number of connection options 86. A first one of the options comprises using a remote desktop protocol client on the user machine to provide a desktop interface. A second one of the options comprises using the browser 80 to provide a desktop interface.

Figure 12:
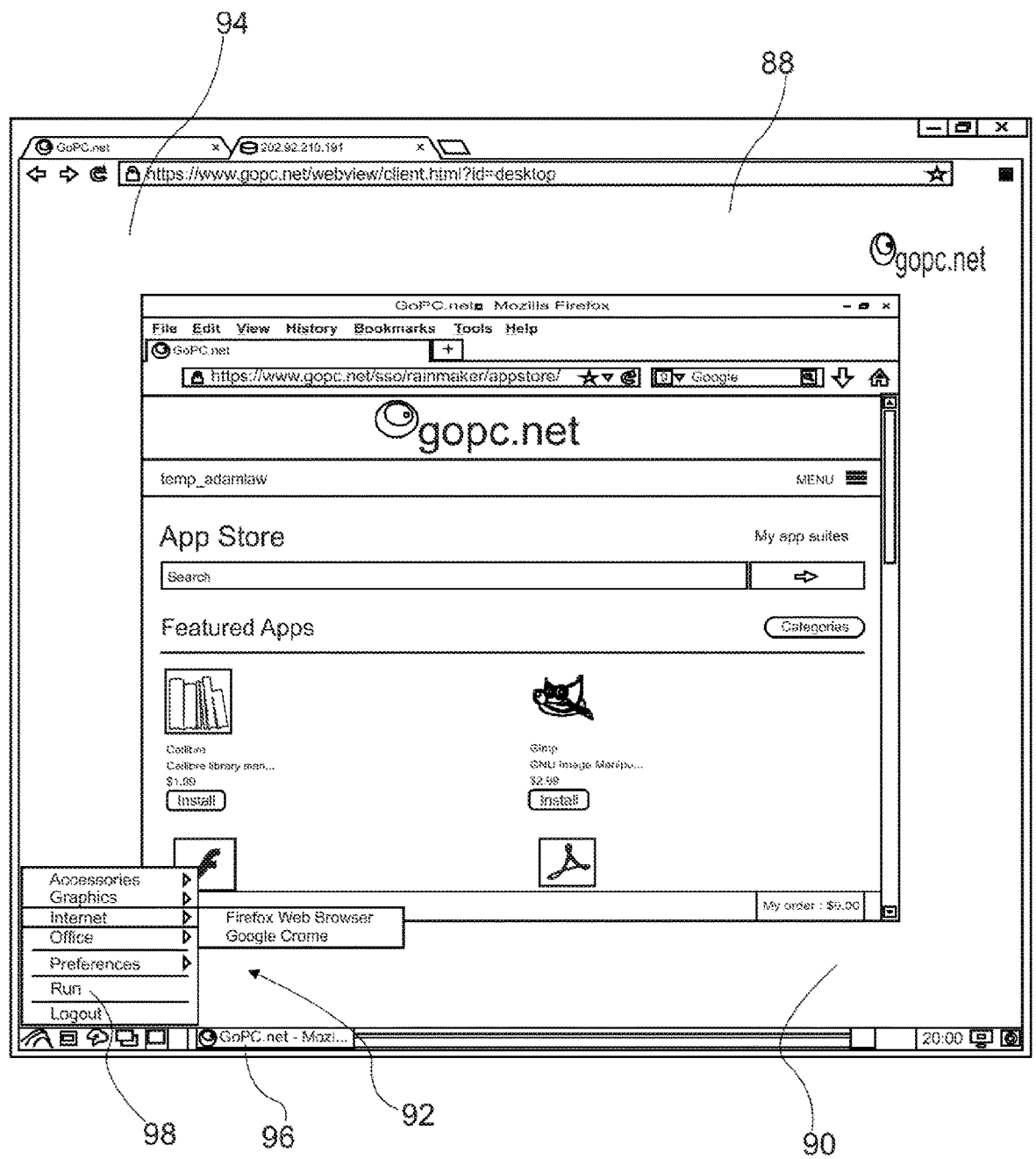
FIG. 12 provides a screen image of an interface provided subsequent to a logon request in the system shown in FIG. 1.

Selecting the second one of the options provides a web client 88 illustrated in FIG. 12. The web client 88 provides a virtual desktop 90 having a menu facility 92 and a desktop 94 upon shortcuts and other items can be placed. The virtual desktop 90 includes a task bar 96 showing visible applications. A run facility 98 is provided for command type execution. Applications are run on an operating system 20 corresponding with a single virtual computer 18.

Notably in other embodiments the system logon request facility 82 forms part of a dashboard authentication such that logging on the dashboard 80 automatically provides a system logon request 52 seeking access to a virtual computer.

Returning to FIG. 7 the provision manager 32 includes an update facility 100, a resume facility 102 and a customization facility 104. The update facility 100 is able to update each virtual computer template 44. The resume facility 102 is able to resume a virtual computer from the pool 40 of suspended virtual computers 42 provided by the pool facility 38. The customization facility is able to customize the resumed virtual computer for the user 54 to provide an active virtual computer.

As will be described the computer system 10 is configured for ensuring that a series of system logon requests by a user results in the user being provided with a series of virtual computers that reflect applied updates. More particularly as a result of each logon request by a user, a new virtual computer for the user is provided ('new' in the sense of being provided as part of a cloning process as described below).

The logon requests and virtual computers are provided on a one to one basis. That is, each logon request results in the provision of a single new virtual computer.

Figure 13:
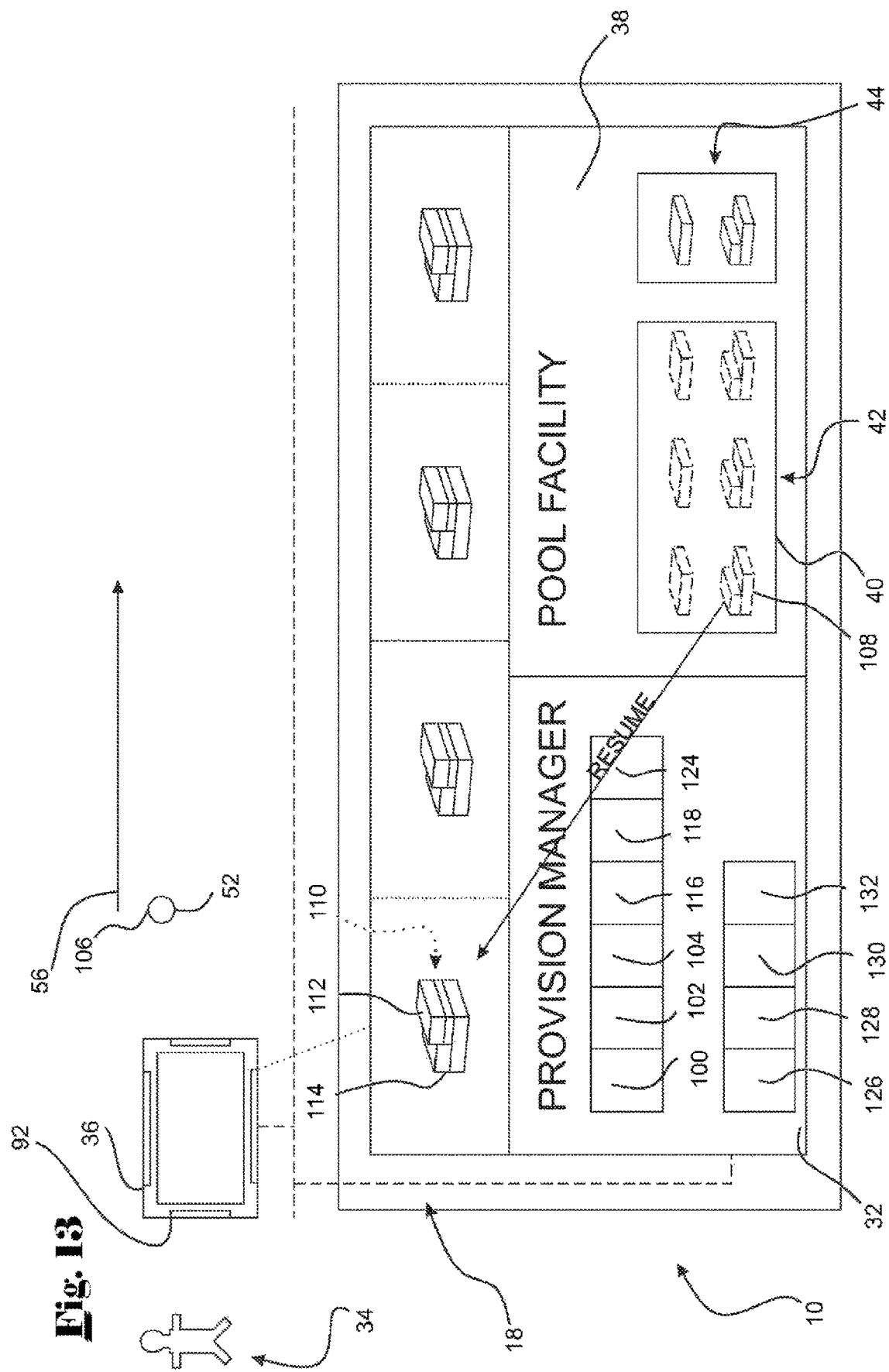
FIG. 13 provides a schematic illustration representing an initial state of the system shown in FIG. 1.

An initial state of the computer system 10 is illustrated in FIG. 13. After a system logon request 106 is initiated, the provision manager 32 uses the resume facility 102 to resume a suspended virtual computer 108 from the pool 40 of the suspended virtual computers 42. The customization facility 104 is then used to customize the resumed virtual computer 110. The customization associates user data 112 with the virtual computer 110 and applies security settings. After customization the provision manager 32 provides an active virtual computer 114 for access by the user. The active virtual computer 114 is then accessible by one of several known access techniques.

As part of the nature of the resume process, the resume facility 102 removes the suspended virtual computer 108 from the pool 40. The resume facility 102 employs a non-repeatable resume associated with the suspended virtual computer being in a non-repeatable suspended state.

The update facility 100 regularly updates each virtual computer template 44 according to notifications from an update notification facility.

After resuming the suspended computer 42, a creation facility 116 schedules: (i) the cloning of a virtual template 44 to provide a virtual machine; and (ii) and the subsequent suspension of the virtual machine to provide a replacement suspended virtual computer 42. Initially there is provided a build instruction list.

The provision manger 32 advantageously includes a termination facility 118 for terminating virtual computers 18 based on system logoff requests by users to ensure that the virtual computers 18 provided to the users are regularly updated. After a user logs off from the computer system 10 the associated virtual computer is scheduled for termination.

Figure 14:
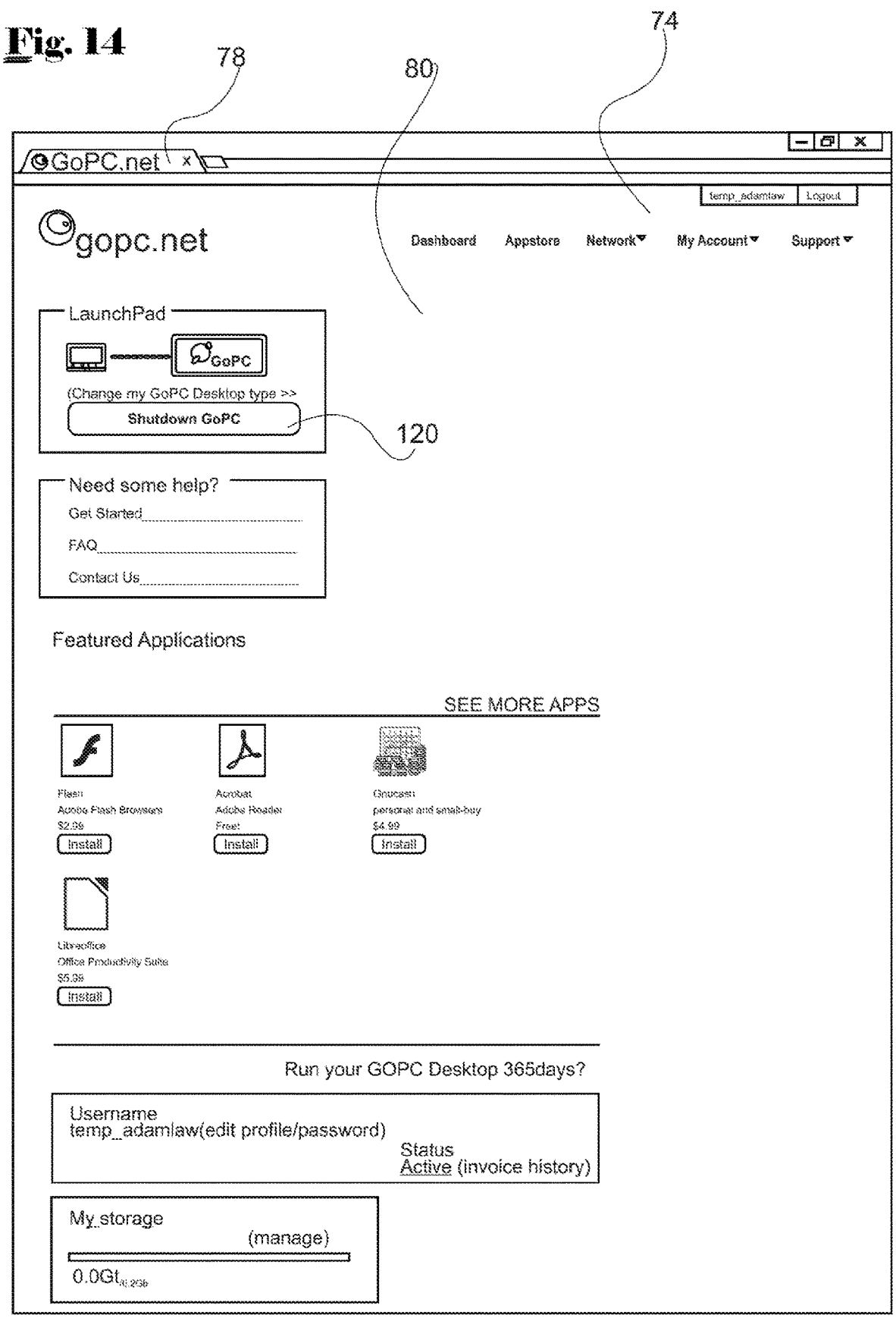
FIG. 14 provides a screen image showing a button allowing the user to issue a logoff request in the system shown in FIG. 1.
Figure 15:
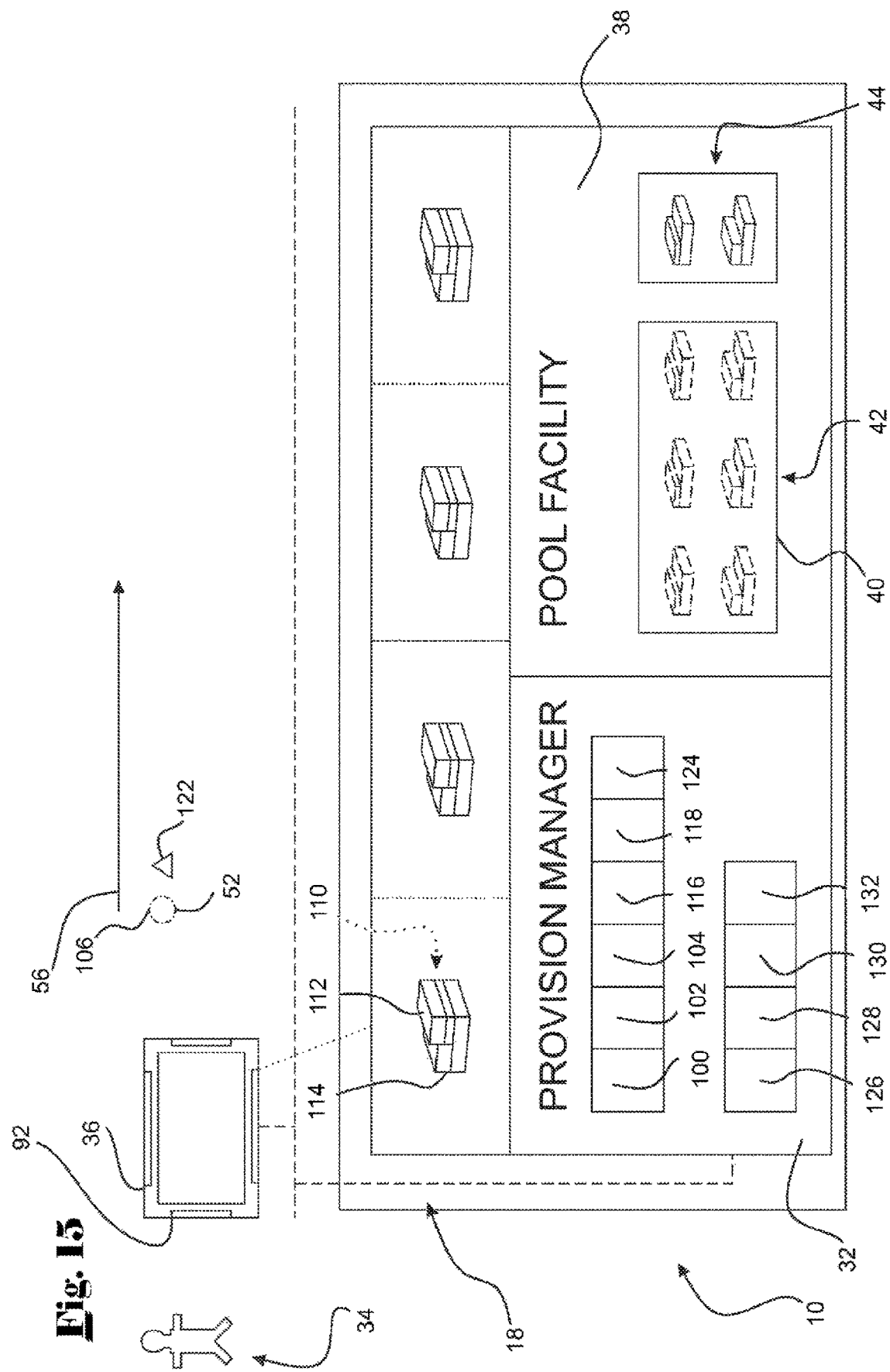
FIG. 15 provides a schematic illustration of a logoff request in relation to FIG. 14.

After the user 54 has been provided with a virtual computer 114, the user is provided with access to a system logoff request facility 120 illustrated in FIG. 14. With the use of the logoff request facility 120, the user is able to issue a system logoff request 122 as shown in FIG. 15.

Advantageously, in the computer system 10, the provision manger 32 is able is ensure that the virtual computers 18 provided to the users 34 are regularly updated. This arises due to the system regularly updating the virtual computer templates 44 from which the suspended virtual computers 42 in the pool 40 are based. The computer system 10 employs Linux Kernel-based Virtual Machine (KVM) technology. Other technologies such as VMware, and Microsoft services may be used in other embodiments.

The provision manager 32 includes a range facility 124 that monitors the turnover of suspended virtual computers 42 in the pool 40. The range facility 124 access both historical and actual login/virtual machine information.

The provision manager 32 ensures that the number of suspended virtual computers in the pool 40 is with a range recommended by the range facility 124. The provision manager 32 ensures that the suspended virtual computers 42 have a desirable turnover rate by limiting the number of suspended virtual computers in the pool 40 in view of anticipated user demand. In this manner the churn of virtual computers through system logon requests and the regular updating of the templates 44 ensures that the suspended virtual computers 42 reflect updates in a timely manner.

In order to apply critical updates to active virtual computers, the provision manager 32 includes an active machine updater 126. The active machine updater 126 is configured to send update requests to the virtual computers 18. The virtual computers 18 respond to notifications from the active machine updater 126 to install updates. In this embodiment the active machine updater is provided by a technology known as 'Puppet' for Linux.

The termination facility 118 is configured to remove old suspended virtual computers in the pool 40 to ensure that the suspended virtual computer 42 in the pool desirably reflect updates and are suitable to be provided to the users 34.

In the past the process of cloning a virtual template 44 to provide an active virtual computer for a user would typically comprise: (i) determining whether a user has suffice credit; (ii) performing a cloning operation on a virtual template; (iii) deploying services on the virtual machine, (iv) installing applications; and (iv) applying security policies to allow access by the user. Performing items (ii), (iii) and (iv) provide a significant delay.

In the present embodiment the creation facility 116 is configured for creating the suspended virtual computers 42 in the pool 40 with each suspended virtual computer 42 having services suspended in a substantially deployed state. This advantageously serves to reduce the time visible to the user when requesting a virtual computer through the dashboard 80.

In particular, by having the remote desktop services of each suspended virtual computer 42 suspended in a substantially deployed state, the time to provide access to the virtual computer is advantageously reduced. In the case of each suspended computer 42 remote desktop services are deployed in the sense that the services are started and can be connected to a user from the network and provide functionality to that user. With the embodiment a substantial improvement in the time between the logon request and the provision of a virtual computer can be provided. Rdp, Xrdp, Xserver and other remote desktop technologies for performing VDI as remote desktop infrastructure are known. Manufactures of VDI systems include VMWare, Citrix and HP.

As discussed the creation facility 116 is provided for providing the suspended virtual computers 42 in the pool 40 by cloning the virtual computer templates 44. An installation facility 128 is provided for installing applications according to the different user classes. A suspension facility 130 is provided for suspending virtual computers as part of the creation process to provide the suspended virtual computers 42. The installation facility 128 is provided for installing applications after cloning a virtual template 44. The provision manager 32 includes an uninstall facility 132 for removing applications after cloning a virtual template 44. Generally uninstalling applications has a greater processing overhead than removing applications. Uninstalling applications can be advantageous in circumstances in which a requirement for uninstallation occurs relatively infrequently.

In the computer system 10, the user classes include accounting classes, secretarial classes and manager classes. The classes are associated with a particular application suites. Only a few user classes do not require the use of LibreOffice. In this embodiment the uninstall facility is provided to uninstall LibreOffice for these users. Advantageously this means that a reduced number of virtual templates have to be maintained by the system.

The active machine updater 126 provides a classification update facility for instructing virtual computers 18 to install or remove applications. Such an instance may occur when there is an alteration in the classification of a user.

The computer system 10 is considered to advantageously maintain a pool of virtual computers in a suspended state with substantially deployed services wherein the number of suspended virtual computers, and updating of templates results in users regularly being provided with virtual computers that incorporate recent updates.

Furthermore, by providing a pool of suspended virtual computers, circumstances involving high demand for virtual computers can be readily accommodated by maintaining a relatively large number of suspended virtual computers in the pool. In this manner the system can be configured to accommodate high demand such as might occur in a group computer laboratory session at a university. At other times a reduced number of suspended computers can be provided in the pool. Native deduplication of in the virtualized computer system is considered to allow for both relatively small and relatively large numbers of suspended virtual computers to be stored in the pool. The use of native deduplication for 'storm' type events is considered to be advantageous.

Figure 16:
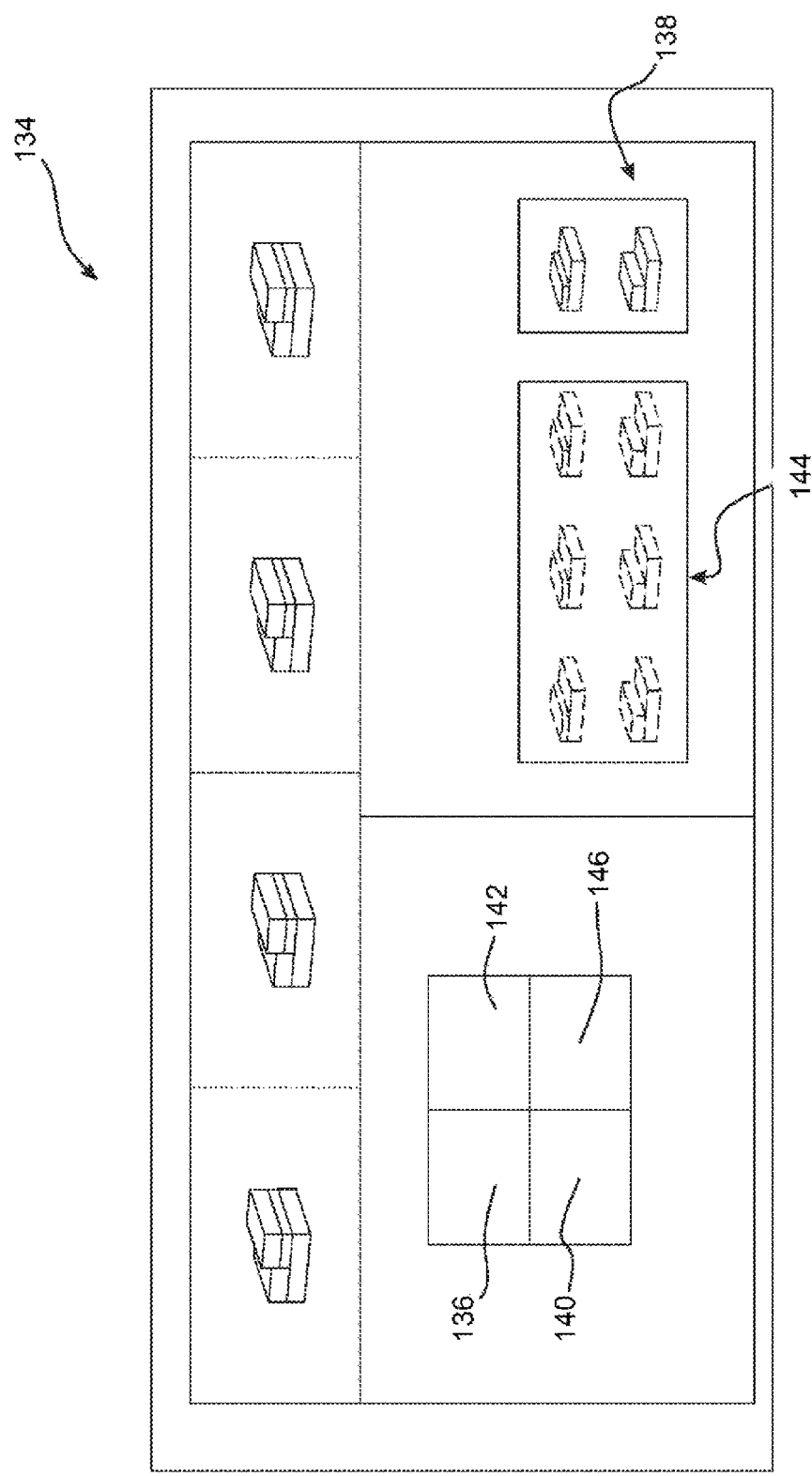
FIG. 16 provides a schematic illustration of a computer system according to a further preferred embodiment of the invention.

In another embodiment illustrated in FIG. 16, there is provided a computer system 134 according to a further preferred embodiment of the present invention. The computer system 134 includes a template provision facility 136 for providing virtual computer templates 138 and an update facility 140 for determining whether revised virtual computer templates are required. A cache facility 142 is provided for caching suspended virtual computers 144 based on the virtual computer templates 138. A resume facility 146 is provided for resuming the cached suspended virtual computers 144 to provide active virtual computers in response to system logon requests by users. The cache facility 142 is configured to cache each suspended virtual computer 144 with services suspended in a substantially deployed state.

Figure 17:
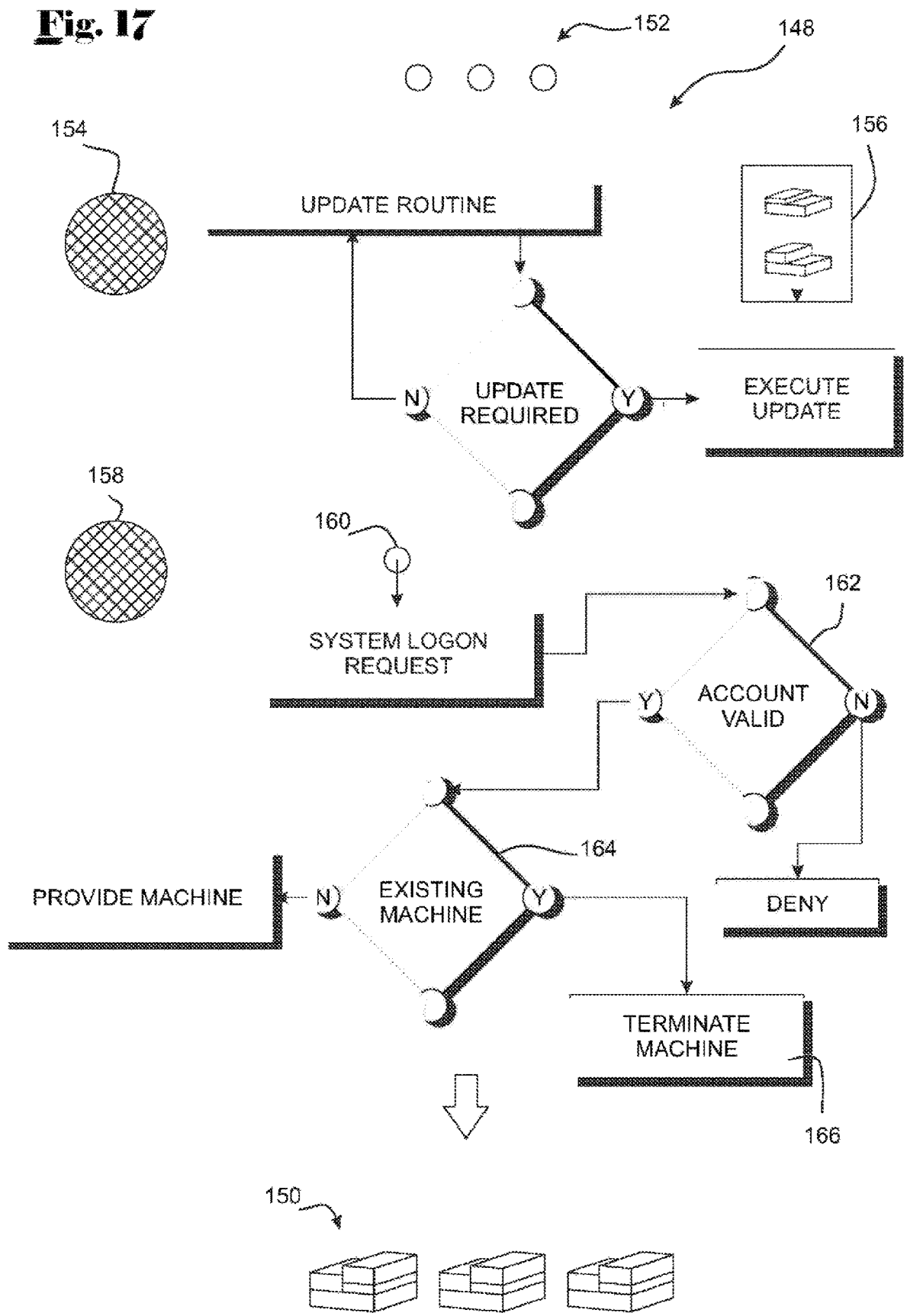
FIGS. 17 and 18 provide schematic illustrations of a method according to a further preferred embodiment of the invention.

Referring to FIG. 17 there is shown a method 148 according to a further preferred embodiment of the present invention. The method 148 advantageously provisions virtual computers 150 in response to system logon requests 152. A number of processes occur in the method 148.

Figure 18:
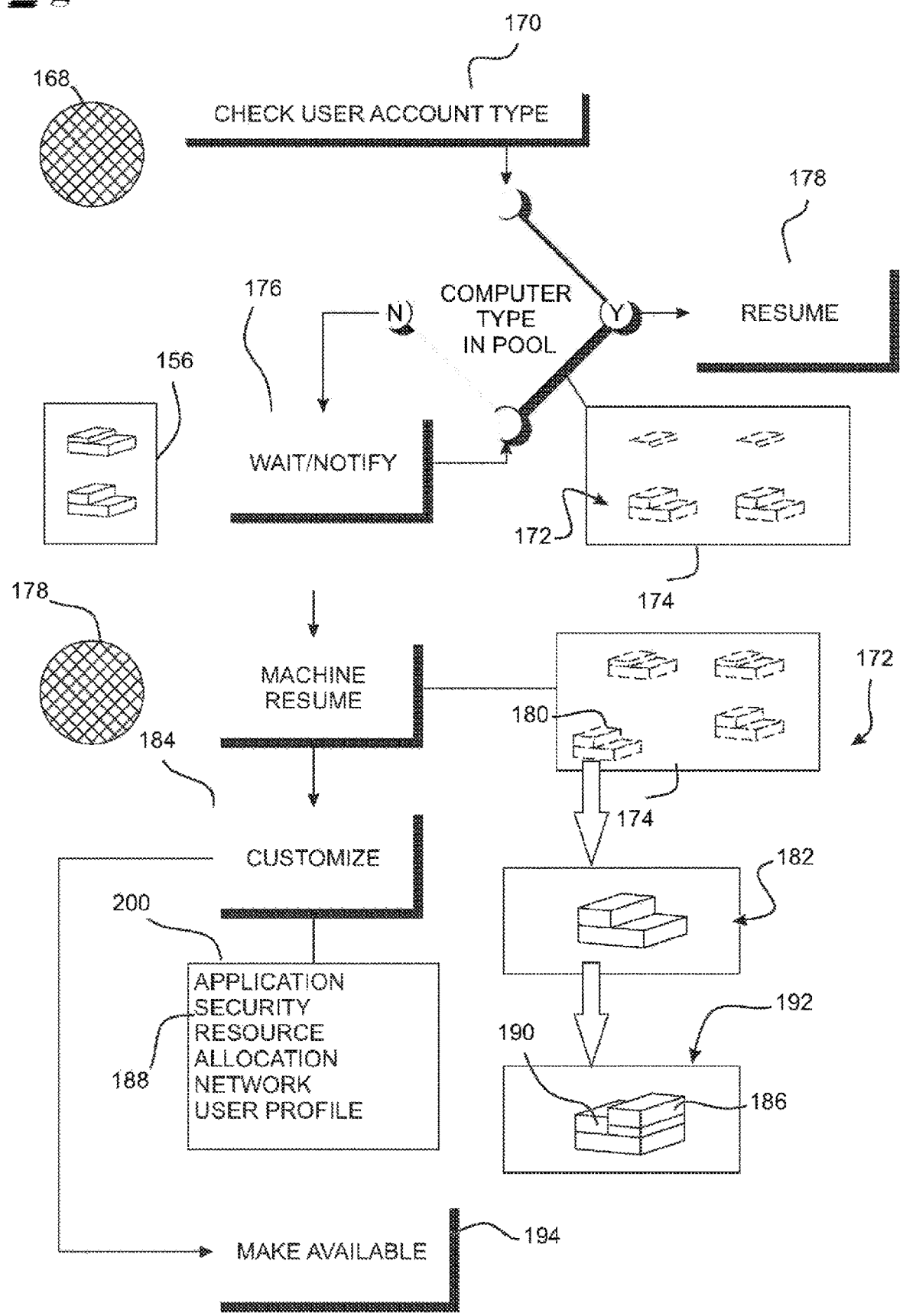

At block 154 the method 148 includes regularly updating a number of virtual computer templates 156. At block 158 the method 148 includes receiving a system logon request 160. In response to the system logon request 160, the method 148 performs an account validation check at block 162. If the account is valid the method 148, at block 164, performs a check to determine whether an active virtual computer is currently associated with the user that issued the system logon request. If there is an existing virtual computer then a logoff request is issued at block 166 to shut-down the existing virtual computer. Once a shutdown request has been issued, the method 144 provides a virtual computer 150 as detailed at a block 168 (See FIG. 18).

At block 170, the method 148 includes checking the user account type to determine the number of suspended virtual computers 172 based on suitable templates 156 in a pool 174. In times of unanticipated high demand the number of suspended virtual computers 172 in the pool 174 may be depleted in which case the method waits a desirable amount of time at block 176 in anticipation of further suspended virtual computers being added to the pool 174.

At block 178 the method 146 commences a resume routine that non-repeatably resumes a suspended computer 180 to provide a virtual computer 182. The act of resuming the suspended computer 180 takes cpu, memory and storage resources from the underlying hypervisor. At block 184 specific resources, security profiles and other configuration settings are customized.

The customization includes the provision of a virtualised user data layer 186. At block 188 modifications are made to an application layer 190 which in the present embodiment is not virtualized. Various customizations are illustrated in block 188. A virtual computer 192 is then made available to the user at block 194. In this embodiment, after resuming a virtual computer it continues to reside on the existing physical machine. Of course the virtual computer could be migrated across the network to another physical machine.

Figure 19:
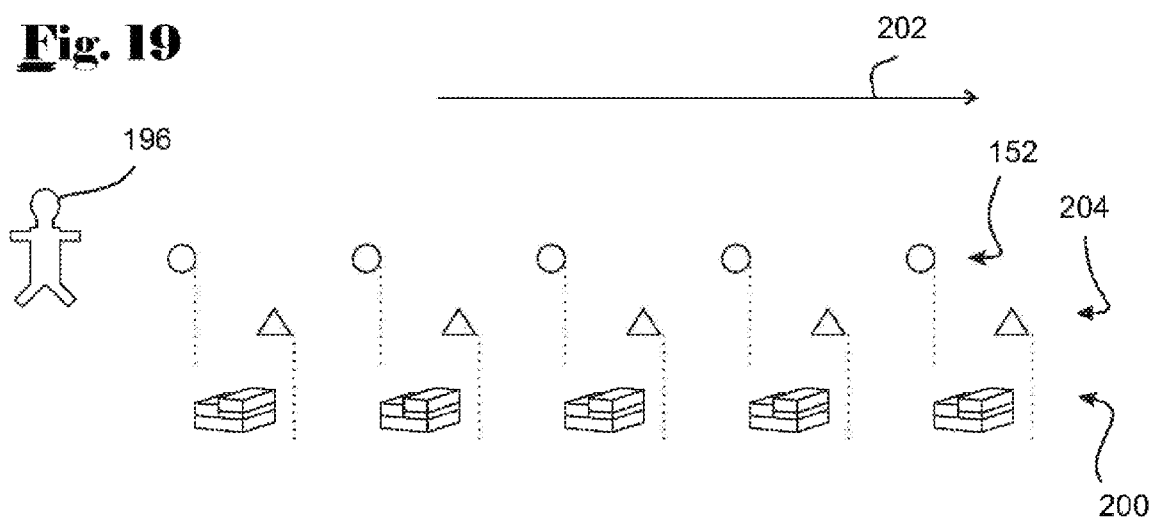
FIG. 19 provides a schematic illustration of a series of logon requests in relation to the method shown in FIG. 17.

Referring to FIG. 19, by applying the method 148 on each system logon by a user 196, the method 148 ensures that that a series of the system logon requests 198 results in the user 196 being provided with a series of virtual computers 200 than reflect applied updates. The method 148 applies these updates at block 154 and the updated virtual computer 200 are accordingly provided to the user 196 at each system logon.

Each virtual computer 200 in the progression of time 202 is provided by resuming a virtual computer from the pool 174 of suspended virtual computers 172, where the suspended virtual computers 172 are based on the virtual computer templates 156. At block 154 the method 148 regularly updates the virtual computer template 156. At block 184 the method 148 customizes the virtual computer for the user after being resumed from the pool 174. The process is repeated and proactively provides updated active virtual computers to each user of the system upon logon requests. The method 146 is applied across all users.

Figure 20:
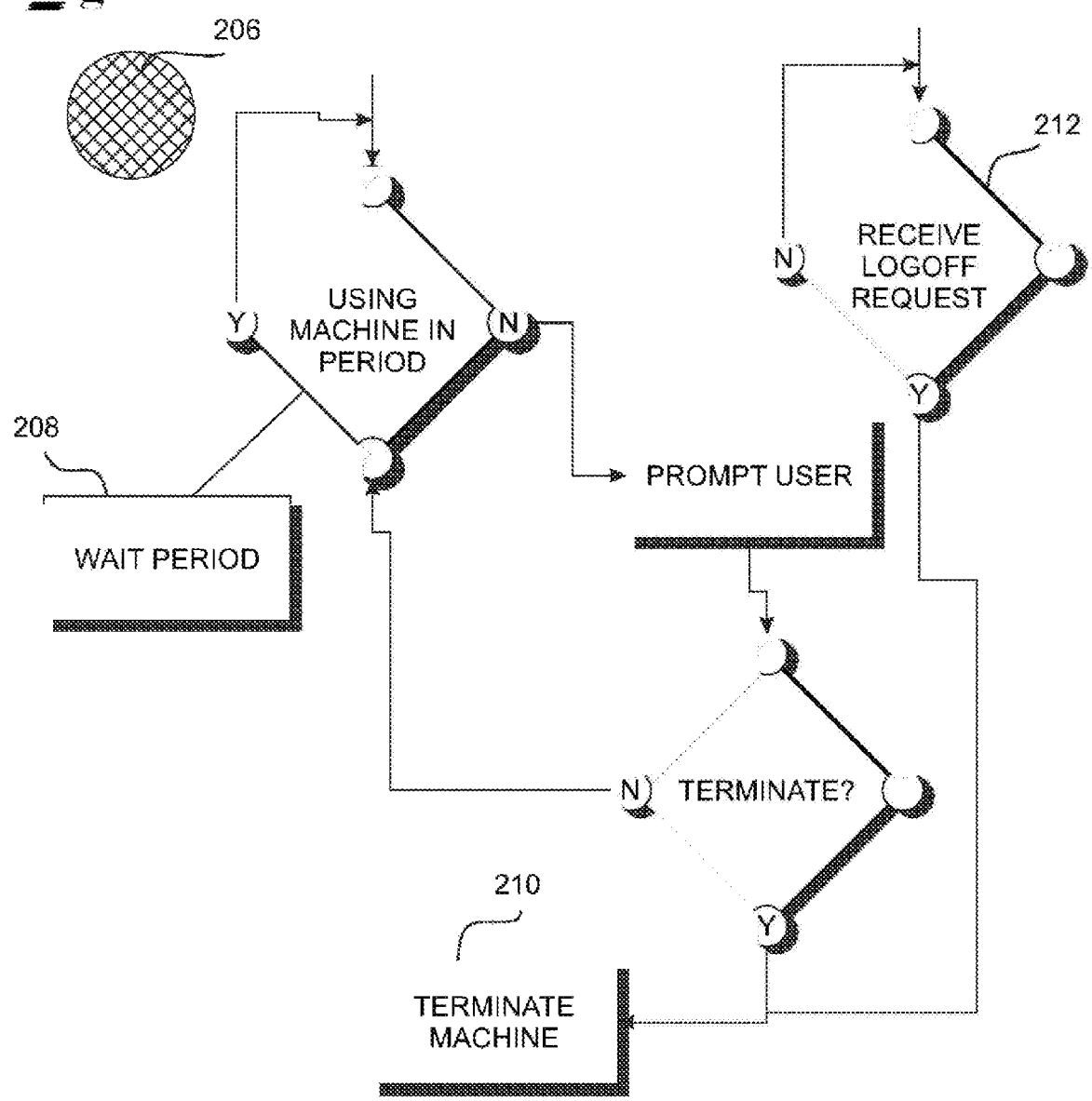
FIG. 20 illustrates the method of FIG. 17 including receiving logoff requests and determining user activity.

The method 148 includes terminating virtual computers 150 based on system logoff requests 204 by users. At block 206 shown in FIG. 20, the method 148 includes receiving logoff requests and determining user activity. In the case where user activity does not meet a threshold in a wait period 208, the machine is terminated at block 210. The user is able to manually issue a logoff request 204 which is received at block 212. The virtual computer is terminated at block 210. The method 148 ensures that the virtual computers provided to the users are regularly updated by terminating virtual computers based on system logoff requests by users.

Figure 21:
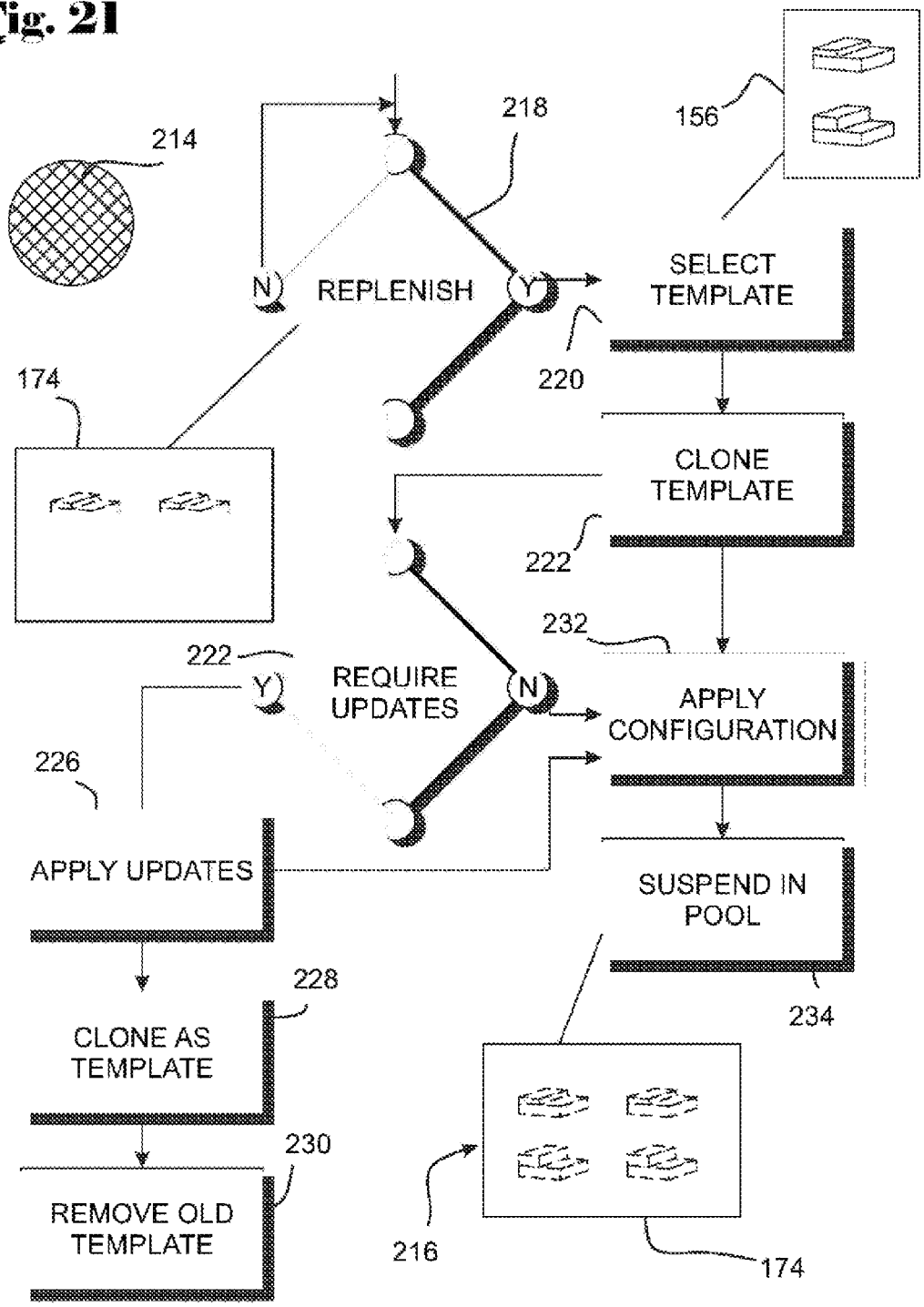
FIGS. 21 and 22 provide further schematic illustrations in relation to the method shown in FIG. 17.

Referring to FIG. 21, at block 214 the method 146 includes providing suspended virtual computers 216 in the pool 174. In this embodiment replenishment is initiated once a virtual computer has been made available to a user. Other embodiments advantageously have a routine that anticipates expected demand. At block 218 the method 146 determines whether to add a suspended virtual computer to the pool 174.

At block 220 a virtual template 156 is selected to replace the earlier resumed suspended virtual computer. At block 222 the template is cloned. At block 224 the template is checked to determine whether updates are required. If updates are required, the updates are applied at block 226. The updated virtual machine is cloned as a template at block 228 and the old template is removed at block 230. Some configuration may occur at block 232. At block 234 the virtual computer is suspended in the pool 174.

When applying the configuration at block 232 the method 148 suspends the services of the cloned template in a substantially deployed state. In the present embodiment the services that are suspended in a substantially deployed state include remote desktop services including XRDP to allow connections from RDP clients and Puppet (to apply ongoing configuration changes). The system services are running and are available for interaction by users. Replenishment occurs each time after an active virtual computer has been provided to a user. In this manner the pool 174 is refreshed.

The method 146 ensures that users are provided with regularly updated virtual computers by effectively maintaining suspended virtual computers in the pool 174 based on one or more regularly updated virtual computer templates 156.

Figure 22:
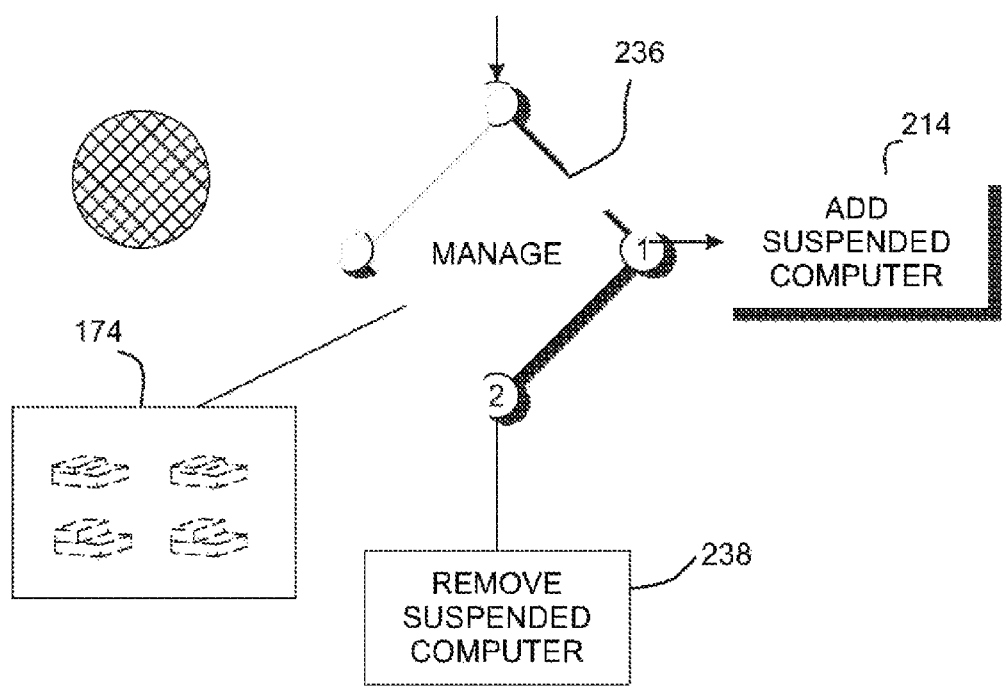

The method 146 effectively maintains suspended virtual computers in the pool 174 by providing suspended virtual computers in the pool and ensuring that the suspended virtual computers have a desirable turnover rate. This is performed at block 236 illustrated in FIG. 22. When it is determined that the suspended computers do not have a desirable turnover rate that is providing regular updates through churn, old suspended computers are removed at block 238 and new suspended computers are added at block 214 as described.

At block 220 the virtual template to clone is selected based on the last suspended virtual computer that was resumed from the pool 174. In other embodiments the routine at block 236 adds and removes suspended computers based on anticipated demand by users.

At block 232 the customization of the active virtual computer 182 includes installing applications according to user class. In this manner suspended virtual computers can be provided in additional class types to the virtual computer templates 156. This is considered to be advantageous as it means that required customization at block 184 for different user classes can be limited. Examples of user class types includes accounting classes, secretarial classes, management classes and so forth.

In order to provide flexibility at block 184, the method 146 includes either installing or uninstalling applications according to a desired user class. Installing applications is generally is less intensive that uninstalling applications. Nonetheless in some situations a reduced number of templates and suspended machines types will be advantageous. In one embodiment word processing and spreadsheet applications are installed on a virtual template 156. During customization at block 184 the word processing and spreadsheet applications are uninstalled for a particular user class to allow for a reduced number of virtual templates and suspended virtual computer types.

The method 146 creates suspended virtual computers in the pool 174 with each suspended virtual computer having services suspended in a substantially deployed state. The method 146 uses this strategy to ensure that application installation or uninstallation at block 184 is limited to 30 seconds or less in time duration. The applicant considers that 20 seconds between requesting access to a virtual computer, with a logon request, provides an acceptable wait time by a user. Of course smaller wait times are desirable.

In the present embodiment the suspended virtual computers 172 are suspended in memory in a non-repeatable suspended state. The native de-duplication provided by virtual machine software that manages suspended virtual machines operates to conserve random memory space (KVM). In addition by being suspended the processing required to maintain the suspended virtual machines is nil or at least relatively insignificant. Suspending in random access memory is the preferred approach. The persistence of the guest's memory is dependent on the virtual host maintaining functionality, i.e. if the power is pulled out of the virtual host a 'suspend' guest will lose its memory state.

Solid state storage may provide another viable option, depending on the speed of the solid state store. As such, in some embodiments, the suspended virtual computers may be suspended on disk in a non-repeatable suspended state. Various other storage methods may be possible including being suspended on disk in a repeatable suspended state; or being suspended in memory in a repeatable suspended state.

In another embodiment according to the present invention, a method creates virtual computer templates and determines whether revised virtual computer templates are required with new updates. Suspended virtual computers are created based on the virtual computer templates and are cached for subsequent resuming to provide active virtual computers in response to system logon requests.

Various methods and systems of provisioning virtual computers are provided by preferred embodiments. By separating the user data it is possible to readily allow a user to deploy a different operating system or desktop environment with the same personal settings and applications. For example in some embodiments there is provided a desktop switching facility. The desktop switching facility allows the user to switch between a Macintosh type desktop environment and a Windows type desktop environment. Examples include switching between LDXE and XFCE. An operating switching facility could for example allow switching between UBUNTU and REDHAT.

Various embodiments advantageously buffer a lot of prepared VM's in advance to speed up deploying new VM's and address boot storm problems. Updates are provided by refreshing and upgrading the technology inside a virtual machine when a user logs in. The de-duplicating environment serves to reduce the physical memory space.

Figure 23:
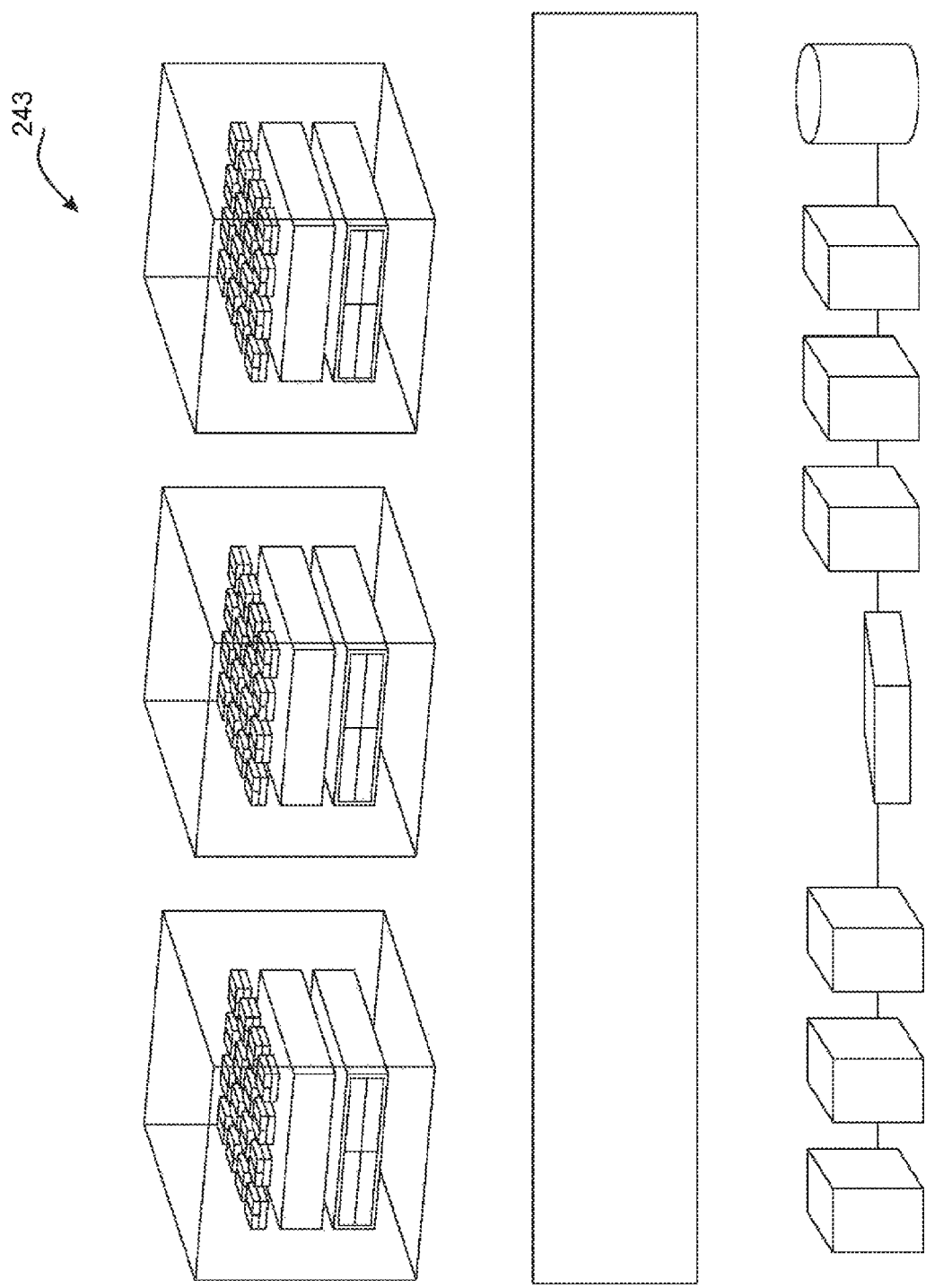
FIG. 23 provides a schematic illustration of a computer system according to another preferred embodiment of the invention.

Referring to FIG. 23 there is shown a system 243 according to a further preferred embodiment of the present invention. In the system the virtual host server the software used to manage virtual desktops is libvirt and KVM. The description of the system is specific to KVM interfaced through libvirt. As would be apparent, various virtualization environments may be provided in other embodiments The system 243 operates using KVM (Kernel-based Virtual Machine). As detailed on Wikipedia 'a wide variety of guest operating systems work with KVM, including many flavours of Linux, BSD, Solaris, Windows, Haiku, ReactOS, Plan 9, and AROS Research Operating System. In addition Android 2.2, GNU/Hurd[8](Debian K16), Minix 3.1.2a, Solaris 10 U3, Darwin 8.0.1 and more Os's and some newer versions of these with limitations are known to work. A modified version of QEMU can use KVM to run Mac OS X.'

KVM provides a virtualisation infrastructure for the Linux kernel. KVM supports (interfaced through libvirt) suspending and resuming virtual machines as described in the earlier embodiments. As detailed on Wikipedia, 'libvirt is an open source API, daemon and management tool for managing platform virtualization. It can be used to manage Linux KVM, Xen, VMware ESX, QEMU and other virtualization technologies. These APIs are widely used in the orchestration layer of hypervisors in the development of a cloud-based solution.' Libvirt is a high level open source API, daemon and management tool for managing platform virtualization. Libvirt provides a virtualisation infrastructure interface to create, start, suspend, resume and destroy virtual machines.

In the system 243 golden images are updated. A golden image is a template for a virtual machine, virtual desktop, virtual server or hard disk image. A golden image is also sometimes referred to as a clone image, master image or base image. To create a golden image, a script is executed to first set up the computing environment exactly the way it is needed and then saves the disk image as a pattern for making more copies. A golden image is an unchanging disk image of an operating system install without any information being stored in RAM. This is due to the golden image being in a pre-boot state In the embodiment, the golden image has defined administrator user accounts that are specific to the golden image. There is no regular user accounts or regular user data associated with a golden image. Building golden images in done by executing the script "buildvm.pl<type>", where the value of "<type>" specifies additional customisations that are done to the gold image produced, namely: specifying the type 'lxde' installs the additional software packages 'lxde-common', 'lxde-icon-theme' and 'lxrandr', and setting the default desktop environment to LXDE.

The type of install provides features such as the GUI layout and visual environment. The system currently produces two gold image types: LXDE and XFCE. There are no limitations to the type of golden images that can be created.

In the system, the golden images can be listed with the following command:

```
(--------------------------------------------------------
root@vhost01:/home/rainmaker/rainmaker-vmscripts# rbd -p gopc-rain-images ls | grep -v
desktop.gopc.net
gnome-20130611; gnome-20130719; lxde-20130718; lxde-20130719; lxde-20130806;
lxde-20130822; lxde-20130827; lxde-20130828; lxde-20130829; lxde-20130902; lxde-
20130929; mate-20130719; trinity-20130719; unity-20130719; xfce-20130719; xfce-
20130806; xfce-20130822; xfce-20130828; xfce-20130902; xfce-20130929;
--------------------------------------------------------)
```

The script 'buildvm.pl' calls the Ubuntu script 'vmbuilder' to create a VM in KVM and start a basic installation of the Ubuntu operating system. When this basic Ubuntu installation is completed, the command 'virsh start' is issued and the VM is powered on and a script 'firstboot.sh' is executed from within the newly created VM to do the following customisations:
  1. Write system configuration files, such as /etc/ldap.conf for LDAP system wide LDAP authentication, /etc/krb5.conf for Kerberos authentication, and /etc/puppet/puppet.conf to allow on the fly application installation.
  2. Pre-installing all the dependencies for all the applications available in the GoPC AppStore. This is achieved by running a script to iterate through the list of applications in the AppStore and create a list of software dependencies where the dependency is associated with a library required for the execution of the program as opposed to a separate application.

These application dependencies include libqt4-xml, libtime-date-perl and python-cairo. By pre-installing the application dependencies the installation time of applications via the AppStore is greatly reduced as there are less packages to download and install. A screenshot of an application store is shown in FIG. 24. A script to achieve the update is detailed below.

```
(--------------------------------------------------------
#!/usr/bin/perl
use strict;
use warnings;
use Frontier::Client qw//;
use Data::Dumper qw/Dumper/;
main(@ARGV);
sub main {
  my %deps = ( );
  my $server = Frontier::Client->new('url' => 'http://10.0.10.41:8081/RPC2',
```

```
use_objects => 0);
  my $apps = $server->call('provisioning.applicationlist');
  my @packages = ( );
  for my $appname (keys %$app) {
      for my $package (@{$apps->{$appname}}) {
        push @packages, $package->{name};
      }
  }
  my $packagelist = join ' ', @packages;
  open my $fh, '-|', "apt-rdepends $packagelist" or die "Could not get dependencies:
$!\n";
  while (my $line = <$fh>) {
      chomp $line;
      next unless $line =~ /(?:Depends|Recommends): (\S+)/;
      my $dep = $1;
      next unless $dep =~ /^lib/ or $dep =~ /^python/;
      next if $dep =~ /^libreoffice/;
      next if $dep =~ /^libtag1/;
      next if $dep =~ /^lib(av|sw|postproc)/ && $dep =~ /extra/;
      $deps{$dep} = 1;
  }
  close $fh;
  my @deps = grep {is_real_package($_)} keys %deps;
  print 'DEBIAN_FRONTEND=noninteractive apt-get -y --no-install-recommends
install ', join ' ', @deps, "\n";
  exit 0;
}
sub is_real_package {
  my ($package) = @_;
  my $res = 0;
  open my $fh, '-|', "apt-cache show $package" or die "Could not get info for '$package':
$!";
  while (my $line = <$fh>) {
      $res = 1;
      last;
  }
  close $fh;
  return $res;
}
-----------------------------------------------------)
```

As discussed above, customisations for the exact golden image type is performed. Once the 'firstboot.sh' script has finished executing, the VM created is powered down, terminating all operating system services and removing any running state in memory, with the command 'virsh destroy'. The following commands are executed:

```
(----------------------------------------------------
  rbd snap create "gopc-rain-images/<name>@current";
  rbd snap protect "gopc-rain-images/<name>@current";
---------------------------------------------------)
```

This makes the golden image disk image available on the storage back-end for cloning. The final step in the process is marking the golden image as 'active' in the provisioning database.

When updated versions of operating system or application software is required a new golden image is built and made active in the provisioning database. Application dependencies are based on the output of the above script and are downloaded from Ubuntu's software repository.

Suspend and resume refers to the process of taking a running virtual desktop and temporarily saving its memory state. At a later time, it is possible to resume the guest to its original running state, continuing execution where it left off. Suspend does not save a repeatably persistent image of the guest's memory.

A VM that is placed into a suspend state uses the same amount of RAM on the virtual host as a running VM, but consumes virtually no CPU time. A large number of suspended VMs can exist on the virtual host without impacting CPU resources.

At a high level the process steps of allocating a virtual desktop to a user are conventionally as follows:
1. User requests a virtual desktop
2. Making a clone(copy) of a golden image
3. Powering the clone on
4. Booting the operating system
5. Starting software services (such as xrdp, sshd and puppet) inside the clone
6. Waiting for the above software services to finish their start up sequences and be available for service (ie xrdp is listening on port 3389 for incoming RDP client connections)
7. Send a message to the user stating the virtual desktop is ready to use In the above list the steps from 4 to 6 can take upwards of 120 seconds to complete. For user driven interactive websites 120 seconds is considered to be too long to wait. Advantageous with the use of libvirt/KVM suspension the present embodiment is able to break this process into two independent separate processes to save the effective wait time for a user.

The first process in the embodiment is as follows:
1. Making a clone(copy) of a golden image
2. Powering the clone on
3. Booting the operating system
4. Starting software services (such as xrdp, sshd and puppet) inside the clone
5. Waiting for the above software services to finish their start up sequences and be available for service ie xrdp is listening on port 3389 for incoming RDP client connections (We test that xrdp is running by the successful TCP connection to port 3389).

6. Suspending the virtual desktop.

In one system, the services started are listed below:

(-------------------------------------------------- avahi-daemon.conf; console.conf; console-setup.conf; container-detect.conf; control-alt-delete.conf; cron.conf; cups.conf, dbus.conf; dmesg.conf, failsafe.conf; flush-early-job-log.conf; hostname.conf, hwclock.conf; hwclock-save-.conf; lightdm.conf; modemmanager.conf; module-init-tools.conf; mountall.conf; mountall-net.conf; mountall-reboot.conf; mountall-shell.conf; mounted-debugfs.conf; mounted-dev.conf; mounted-proc.conf; mounted-run.conf; mounted-tmp.conf; mounted-var.conf; networking.conf; network-interface.conf; network-interface-container.conf; network-interface-security.conf; network-manager.conf; passwd.conf; plymouth.conf; plymouth-log.conf; plymouth-ready.conf; plymouth-splash.conf; plymouth-stop.conf; plymouth-upstart-bridge.conf; procps.conf; rc.conf; rcS.conf; rc-sysinit.conf; resolvconf.conf; rsyslog.conf; setvtrgb.conf; shutdown.conf; ssh.conf; tty1.conf; tty2.conf; tty3.conf; tty4.conf; tty5.conf; tty6.conf; udev.conf; udev-fallback-graphics.conf; udev-finish.conf; udevmonitor.conf; udevtrigger.conf; upstart-socket-bridge.conf; upstart-udev-bridge.conf; ureadahead.conf; ureadahead-other.conf; wait-for-state.conf; S20libnss-ldap; S20nscd; S20saslauthd; S20xrdp; S21puppet; S25openafs-client; S50pulseaudio; S70pppd-dns; S75sudo; S99grub-common; S99nxsensor; S99nxserver; S99ondemand; S99rc.local

--------------------------------------------------)

Through our testing we have found one of the last services to complete it's start-up sequence is the xrdp service.

The second process is as follows:
1. User requests a virtual desktop
2. Resuming the suspended virtual desktop
3. Send a message to the user stating the virtual desktop is ready to use The first process takes approximately 120 seconds to complete, and can be done independently of any user interaction. The second process takes less than 1 second, which means that the time taken for a user requesting a virtual desktop and the virtual desktop is minimal.

FIG. 25 provides a screen shot providing a time breakdown of the first process (building a clone of a golden image and putting it in a suspend state) under high virtual host system load. As shown the substantial time processes comprise cloning, waiting for XRDP and sleeping.

FIG. 26 provides a screenshot providing a time breakdown of the second process (setting a virtual desktop to resume state) under high virtual host system load. Because the cloning process is decoupled from the user interaction, system load on the virtual host does not substantially impact the interactive website processes of a user being allocated a virtual desktop.

In computing, data de duplication is a specialised data compression technique for eliminating duplicate copies of repeating data. De-duplication is applied to both contents in RAM and contents on disk storage. In the system de-duplication is provided by KVM for RAM and Ceph for network storage. Owing to the fact all virtual desktops of the same type are cloned from the same relatively small set of golden images the set of virtual desktops compress very well, giving significant savings in terms of required RAM and disk usage. This is considered to be advantageous.

Cloned images are built and put into a suspend mode (as detailed above), and then placed in a FIFO (First In, First Out) queue (referred to as the Virtual Desktop Pool) for later allocation and use by a user.

The code listed below regularly polls for the size of the suspended virtual desktop allocation pool, and triggers the construction of a clone from a gold image when the number of suspended virtual desktops drops below the desired suspended pool size.

```
(--------------------------------------------------
#!/usr/bin/perl
use strict;
use warnings;
use Frontier::Client qw//;
use Data::Dumper qw/Dumper/;
use POSIX qw/:sys_wait_h/;
my $CHILD_LIMIT = 7;
my %children = ( );
sub REAPER {
    while ((my $child = waitpid(-1, WNOHANG)) > 0) {
        delete $children{$child};
    }
    $SIG{CHLD} = \&REAPER;
}
main(@ARGV);
sub main {
    my $provisioning = Frontier::Client->new('url' => 'http://provisioning:8081/RPC2',
use_objects => 0);
    my $desired = {
        lxde => 25,
        xfce => 15,
    };
    $SIG{CHLD} = \&REAPER;
    while (1) {
        eval {
            for my $basename (keys %$desired) {
                my $pools = $provisioning->call('provisioning.machinepoolsize');
                my $sparecount = $pools->{$basename} || 0;
                my $poolsize = $desired->{$basename} || 3;
                if ($sparecount < $poolsize && scalar keys %children < $CHILD_LIMIT) {
                    my $pid = fork( );
                    if ($pid) {
                        $children{$pid} = 1;
```

```
            print "Child count is ", scalar keys %children, "\n";
            sleep 1;
         } elsif (defined $pid) {
            eval {
               my $orchestration = Frontier::Client->new('url' =>
'http://orchestration:8000/RPC2', use_objects => 0);
               print "Pool for $basename is $sparecount, building machine\n";
               print Dumper($orchestration->call('CreatePoolVM', $basename, 1));
            };
            if ($@) {
               print "$@\n";
            }
            exit 0;
         } else {
            print "Fork error: $!\n";
         }
      } else {
         sleep 1;
      }
   }
   sleep 1;
};
if ($@) {
   print "Error occured: $@\n";
   sleep 15;
}
}
}
)
```

Virtual desktops have a life-cycle of the following states:

1. Building—when a virtual desktop in the process of being cloned from a gold image, powering on and starting service up until the virtual desktop is put into a suspend state.

2. Available—when a virtual desktop has been put into a suspend state and is placed into the Virtual Desktop Pool ready for user allocation.

3. In-Use—when a virtual desktop has been allocated to a user, has been resumed from it's suspended state and is currently in use.

4. Finished—when a virtual desktop is no longer in by a user and has been powered off by the system and the associated disk image has been removed.

When a user requests a virtual desktop via the GoPC website a suspended virtual desktop is chosen from the Virtual Desktop Pool (the oldest virtual desktop is always chosen here) and resumed with the command 'virsh resume'. Once resumed DNS records are updated to point <user's username>.desktop.gopc.net to the virtual desktop's IP address and the user's applications are installed and the user's configurations are applied.

All user created data and user application configuration and customisation is stored on networked storage (networked home directories) and not on the virtual desktops themselves. The networked home directories for users allows for the persistence of user data and configurations between different instances of virtual desktops.

User data and presented to the virtual desktop systems via the AFS distributed networked file system. User home directories are mounts from the following location: /afs/gopc.net/users/<user's unique UID number>.

Each time a new golden image is built the latest versions of operating system software, application software and application software dependencies from Ubuntu's software repository. To minimise any potential incompatibilities between new versions of software with user data and user configurations from older versions of software gold images are built on Ubuntu's LTS (Long Term Support) editions. Ubuntu LTS editions are created with a release life time of 5 years, and software compatibility between updated versions of software are tested by Ubuntu's internal QA teams to prevent this type of software breakages.

Once a virtual desktop has been determined to no longer be in use (either because of user interaction or due to lack of interactive user connections via RDP or NX) it is terminated. Termination involves powering the virtual desktop off (via the command 'virsh destroy'), removing the machine definition from libvirt/KVM (via the command 'virsh undefine') and removing the cloned disk image (via the command 'rbd rm'). Once a virtual desktop has been terminated it no longer uses any resources on the virtual host. Code to terminate virtual desktops is listed below:

```
(
def clean_sessions(cleanup):
   server = xmlrpclib.ServerProxy('http://orchestration-8000')
   timeouts = { }
   for userid,idletime in db.Timeout.objects.all( ).values_list('userid',
'idletime'):
      timeouts[userid] = idletime
   now = datetime.datetime.today( )
   for session in db.Session.objects.filter(stoptime = None, type=0):
      machine = session.machine
      usertype = timeouts.get(session.userid, 0)
      idletime = idletimes[usertype]
      if (session.lastseen + datetime.timedelta(minutes=idletime)) < now: '
         if cleanup:
            print server.DeleteDesktopIdle(session.userid)
      # free users, disconnect after 1 hours active time
      elif usertype == 0 or usertype == 1:
         if (session.starttime + datetime.timedelta(minutes=60)) < now:
            if cleanup:
               print server.DeleteDesktopIdle(session.userid)
)
```

Figure 27:
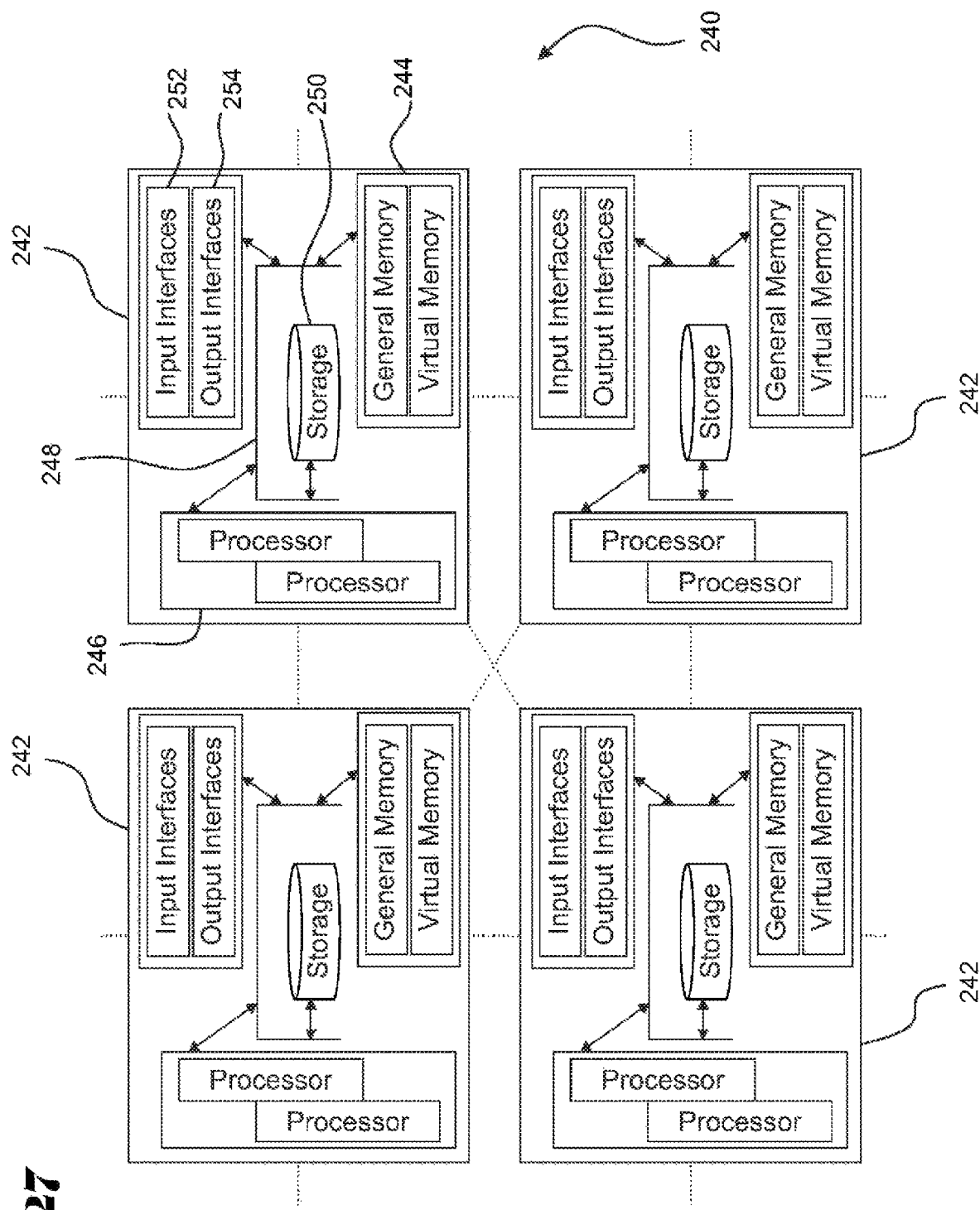
FIG. 27 provides an illustration of a system according to a further preferred embodiment of the present invention.

Referring to FIG. 27 there is shown a schematic diagram of a computer system 240 that is configured to provide preferred arrangements of systems and methods described herein. The computer system 240 is provided as a distributed computer environment containing a number of individual computer systems 242 (computers/computing devices) that cooperate to provide the preferred arrangements. In other embodiments the computer system 240 is provided as a single computing device.

As shown, a first one of the computing devices 242 includes a memory facility 244. The memory facility 244 includes both 'general memory' and other forms of memory such as virtual memory. The memory facility 244 is operatively connected to a processing facility 246 including at least one processor. The memory facility 244 includes computer information in the form of executable instructions and/or computer data. The memory facility 244 is accessible by the processing facility 246 in implementing the preferred arrangements.

As shown each of the computing devices 242 includes a system bus facility 248, a data store facility 250, an input interface facility 252 and an output interface facility 254. The data store facility 250 includes computer information in form of executable instructions and/or computer data. The data store facility 250 is operatively connected to the processing facility 246. The data store facility 250 is operatively connected to the memory facility 244. The data store facility 250 is accessible by the processing facility 246 in implementing the preferred arrangements.

Computer information may be located across a number of devices and be provided in a number of forms. For example the data store facility 250 may include computer information in the form of executable instructions and/or computer data. The computer data information may be provided in the form of encoded data instructions, data signals, data structures, program logic for server side operation, program logic for client side operation, stored webpages and so forth that are accessible by the processing facility 246.

On one level, input interfaces allow computer data to be received by the computing devices 242. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 252, 254 provide input and output interfaces that are operatively associated with the processing facility 246. The input and output facilities 252, 254 allow for communication between the computing devices 242 and individuals.

The computing devices 242 provide a distributed system in which several devices are in communication over network and other interfaces to collectively provide the preferred arrangements. Preferably there is provided at least one client device in the system of computing devices 242 where the system is interconnected by a data network.

The client device may be provided with a client side software product for use in the system which, when used, provides systems and methods where the client device and other computer devices 242 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions they preferably encode the systems, components and facilities described herein. For example a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants and distributed computing systems.

Computer readable mediums and so forth of the type envisaged are preferably intransient. Such computer readable mediums may be operatively associated with computer based transmission facilities for the transfer of computer data. Computer readable mediums may provide data signals. Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms arrangement. Methods will be apparent from systems described herein and systems will be apparent from methods described herein.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The claims defining the invention are as follows:

1. A method of providing virtual computers to users, the method comprising:
   (a) receiving a series of system logon requests by each user for a virtual computer, and in response to each received system login request providing the respective user with a series of virtual computers that reflect applied updates over a period of time in which the updates become available for application;
   (b) maintaining a pool of suspended virtual computers as a cache for load storm logon requests with each virtual computer being provided by resuming a suspended virtual computer from the pool of suspended virtual computers where the suspended virtual computers are based on at least one virtual computer template;
   (c) customizing each virtual computer for the particular user after the suspended virtual computer is resumed from the pool of suspended virtual computers to provide an active virtual computer; said customizing each virtual computer for the particular user including providing the resumed virtual computer with a user data layer;
   (d) applying updates to the at least one virtual computer template to ensure that each virtual computer in the series of virtual computers provided to each user reflects the applied updates when the updates become available to be applied to the at least one virtual computer template;
   (e) deleting or otherwise removing a proportion of the suspended virtual computers in the pool of suspended virtual computers, wherein the deleting or otherwise removing the proportion of the suspended virtual computers from the pool occurs with respect to suspended virtual computers that have met an age criterion, and the deletion or otherwise removal of each suspended virtual computers from the pool does not leave a copy of the suspended virtual computer which is able to be resumed, wherein one or more of each proportion of deleted or otherwise removed suspended virtual computer is replaced with one of the suspended virtual computers based on the at least one virtual computer template which reflects the applied updates when the updates become available to be applied to the at least one virtual computer template,
   (f) using the updated at least one virtual computer template to create and then store a replacement for each deleted or otherwise removed suspended virtual computer in the pool of suspended virtual computers; and
   (g) each of the series of virtual computers provided to the respective user is terminated when one of either a system logoff request is made, or user activity does not meet a user activity threshold, wherein the terminated virtual computers are neither suspended nor returned to the pool of suspended virtual computers so that the terminated virtual computers are not able to be used again in the provision of the virtual computers to the users.

2. A method as claimed in claim 1 wherein customizing each virtual computer for the particular user includes installing applications according to a desired user group after resuming a corresponding suspended virtual computer from the pool of suspended virtual computers.

3. A method as claimed in claim 1 wherein customizing each virtual computer for the particular user includes uninstalling applications according to a desired user group after resuming a corresponding suspended virtual computer from the pool of suspended virtual computers.

4. A method as claimed in claim 1 wherein customizing each virtual computer for the particular user includes installing or uninstalling applications according to a desired user group after resuming a corresponding virtual computer from the pool of suspended virtual computers, the installation or uninstallation being limited to 30 seconds or less in time duration for each virtual computer.

5. A method as claimed in claim 1 including providing the suspended virtual computers in the pool with each suspended virtual computer having remote desktop services suspended in a state in which the services are available as part of a fully operational system with the remote desktop services being enabled.

6. A computer system for providing virtual computers to users, the computer system comprising: one or more computer processors coupled to a memory storage device; a pool facility for storing a pool of suspended virtual computers maintained as a cache for load storm logon requests; a provision manager for ensuring that a series of system logon requests by each user results in the user being provided with a series of virtual computers; the provision manager including an update facility, a resume facility and a customization facility; the update facility for applying updates to the at least one virtual computer template, the at least one virtual computer template being used to create each suspended virtual computer; the resume facility for resuming suspended virtual computers from the pool of suspended virtual computers provided by the pool facility; the customization facility for customizing each virtual computer for the particular user after the virtual computer is resumed from the pool of suspended virtual computers, the customization including providing the resumed virtual computer with a user data layer, wherein the provision manger includes a termination facility for terminating virtual computers based on system logoff requests, or when user activity does not meet a user activity threshold, wherein terminated virtual computers are not suspended nor returned to the pool of suspended virtual computers so that the terminated virtual computers not able to be used again in the provision of virtual computers to the users; wherein the provision manager is configured to replace the deleted or otherwise removed suspended virtual computers in the pool of suspended virtual computers with newly provided suspended virtual computers based on the updated at least one virtual computer template which reflects the applied updates when the updates become available to be applied to the at least one virtual computer template.

7. A computer system as claimed in claim 6 wherein the provision manager is configured to maintain the suspended virtual computers in the pool by deleting or otherwise removing suspended virtual computers in the pool where the suspended virtual computers were provided at an earlier date.

8. A computer system as claimed in claim 6 wherein the customization facility is configured to customize each virtual computer for the particular user by installing applications according to a desired user group after resuming a corresponding virtual computer from the pool of suspended virtual computers.

9. A computer system as claimed in claim 6 wherein the customization facility is configured to customize each virtual computer for the particular user by uninstalling applications according to a desired user group after resuming a corresponding suspended virtual computer from the pool of suspended virtual computers.

10. A computer system as claimed in claim 6 wherein the customization facility is configured to customize each virtual computer for the particular user by installing or uninstalling applications according to a desired user group after resuming a corresponding suspended virtual computer from the pool of suspended virtual computers, the installation or uninstallation being limited to 30 seconds or less in time duration for each virtual computer.

11. A computer system as claimed in claim 6 wherein the provision manager includes a creation facility for providing suspended virtual computers in the pool with each suspended virtual computer having remote desktop services suspended in a state in which services are available as part of a fully operational system with the remote desktop services being enabled.

12. A computer system as claimed in claim 6 wherein the provision manager includes: a creation facility for providing the suspended virtual computers in the pool by cloning one or more of the at least one virtual computer template to provide a number of suspended virtual computers; and a suspension facility for suspending the virtual computers.

13. A non-transitory computer readable medium having stored thereon computer executable instructions to:
(a) ensure that a series of system logon requests by each user for a virtual computer results in the user being provided with a series of virtual; said ensuring including maintaining a pool of suspended virtual computers as a cache for load storm logon requests with each virtual computer being provided by resuming a suspended virtual computer from a pool of suspended virtual computers;
(b) customize each virtual computer for the particular user after the suspended virtual computer is resumed from the pool of suspended virtual computers to provide an active virtual computer; said customizing each virtual computer for the particular user including providing the resumed virtual computer with a user data layer;
(c) apply updates to the at least one virtual computer template;
(d) use the at least one virtual computer template to create each suspended virtual computer;
(e) delete or otherwise remove a proportion of the suspended virtual computers in the pool of suspended virtual computers, wherein deleting or otherwise removing the proportion of the suspended virtual computers from the pool occurs with respect to suspended virtual computers that have met an age criterion, and the deletion or otherwise removal of each suspended virtual computers from the pool does not leave a copy of the suspended virtual computer which is able to be resumed;
(f) terminate each of the series of virtual computers provided to the respective user when one of either a system logoff request is made, or user activity does not meet a user activity threshold, wherein terminated virtual computers are not suspended nor returned to the pool of suspended virtual computers so that the terminated virtual computers are not able to be used again in the provision of the virtual computers to the users;
(g) replace the deleted or otherwise removed suspended virtual computers in the pool of suspended virtual computers with newly provided suspended virtual computers based on the updated at least one virtual computer template which reflects the applied updates when the updates become available to be applied to the at least one virtual computer template.

\* \* \* \* \*